(12) United States Patent
Wang et al.

(10) Patent No.: US 10,637,905 B2
(45) Date of Patent: Apr. 28, 2020

(54) METHOD FOR PROCESSING DATA AND ELECTRONIC APPARATUS

(71) Applicant: Lenovo (Beijing) Co., Ltd., Beijing (CN)

(72) Inventors: Gaoge Wang, Beijing (CN); Kai Kang, Beijing (CN); Shifeng Peng, Beijing (CN); Xiangyang Li, Beijing (CN); Kai Li, Beijing (CN); Lifan Xiao, Beijing (CN)

(73) Assignee: Lenovo (Beijing) Co., Ltd., Beijing (CN)

( * ) Notice: Subject to any disclaimer, the term of this patent is extended or adjusted under 35 U.S.C. 154(b) by 1173 days.

(21) Appl. No.: 14/230,109

(22) Filed: Mar. 31, 2014

(65) Prior Publication Data
US 2015/0058394 A1    Feb. 26, 2015

(30) Foreign Application Priority Data

Aug. 23, 2013 (CN) .......................... 2013 1 0373827
Nov. 20, 2013 (CN) .......................... 2013 1 0590602

(51) Int. Cl.
G06F 3/0481 (2013.01)
G06F 3/0482 (2013.01)
H04L 29/06 (2006.01)

(52) U.S. Cl.
CPC ........ *H04L 65/602* (2013.01); *H04L 65/4015* (2013.01)

(58) Field of Classification Search
CPC .. G06F 3/0481; G06F 3/0482; G06F 3/04817; G06F 9/4443; G06F 3/04847; G06F 11/3664; H04L 65/602; H04L 65/4015
See application file for complete search history.

(56) References Cited

U.S. PATENT DOCUMENTS 6,847,778 B1 * 1/2005 Vallone ............... G06F 3/04847
                                              386/205
7,290,698 B2 * 11/2007 Poslinski ........... H04N 5/44513
                                              235/375
7,313,808 B1 * 12/2007 Gupta .................. G11B 27/034
                                              348/E7.061

(Continued)

FOREIGN PATENT DOCUMENTS

CN    102347044 A    2/2012
EP    1062598 B1 * 10/2003    ............... H04N 7/15

OTHER PUBLICATIONS

First Chinese Office Action regarding Application No. 201310590602.2 dated Mar. 11, 2016. English translation provided by Unitalen Attorneys at Law.

*Primary Examiner* — Ryan Barrett
*Assistant Examiner* — Erik V Stitt
(74) *Attorney, Agent, or Firm* — Harness, Dickey & Pierce, P.L.C.

(57) ABSTRACT

A method for processing data and an electronic apparatus are provided. The method includes: obtaining multimedia data captured by a multimedia capture of an electronic apparatus, obtaining first data captured by a data capture unit of the electronic apparatus, establishing an association relationship between the first data and the multimedia data in terms of time; and generating second data in the case that the process of capturing the multimedia data is completed, wherein the second data includes the association relationship.

16 Claims, 16 Drawing Sheets

(56) References Cited

U.S. PATENT DOCUMENTS

| | | | |
|---|---|---|---|
| 7,774,811 B2 * | 8/2010 | Poslinski | H04N 5/44543 725/34 |
| 7,827,490 B2 * | 11/2010 | Kapur | G06F 3/04847 715/716 |
| 7,954,049 B2 * | 5/2011 | Fletcher | G06F 17/241 707/608 |
| 8,751,921 B2 * | 6/2014 | Schormann | G06Q 10/10 715/203 |
| 8,806,385 B1 * | 8/2014 | Rinckes | G06F 3/04847 345/173 |
| 8,978,062 B2 * | 3/2015 | Loebig | G11B 27/34 725/37 |
| 9,043,701 B2 * | 5/2015 | Querre | G11B 20/10 715/716 |
| 9,264,776 B2 * | 2/2016 | Jung | H04N 21/47217 |
| 9,658,757 B2 * | 5/2017 | Wang | G06F 3/04847 |
| 9,767,087 B1 * | 9/2017 | Petrov | H04N 21/437 |
| 2002/0099552 A1 * | 7/2002 | Rubin | G09F 27/00 704/270 |
| 2003/0121055 A1 * | 6/2003 | Kaminski | H04N 5/76 725/115 |
| 2003/0184598 A1 * | 10/2003 | Graham | G06F 17/30017 715/838 |
| 2006/0013556 A1 * | 1/2006 | Poslinski | H04N 5/44543 386/250 |
| 2006/0020966 A1 * | 1/2006 | Poslinski | G09B 5/00 725/37 |
| 2006/0045470 A1 * | 3/2006 | Poslinski | H04N 5/44513 386/297 |
| 2007/0192723 A1 * | 8/2007 | Anzelde | G06F 3/0481 715/772 |
| 2008/0089671 A1 * | 4/2008 | Lang | G11B 27/034 386/229 |
| 2008/0155615 A1 * | 6/2008 | Craner | H04N 5/765 725/91 |
| 2008/0195948 A1 * | 8/2008 | Bauer | G06F 3/048 715/719 |
| 2009/0051487 A1 | 2/2009 | Sarig et al. | |
| 2011/0039598 A1 * | 2/2011 | Tang | H04N 5/772 455/556.1 |
| 2014/0082666 A1 * | 3/2014 | Bloch | G11B 27/34 725/37 |
| 2014/0267549 A1 * | 9/2014 | Pinter | G06F 19/3418 348/14.03 |

* cited by examiner

METHOD FOR PROCESSING DATA AND ELECTRONIC APPARATUS

CROSS-REFERENCES TO RELATED APPLICATIONS

The present application claims priority to Chinese Patent Application No. 201310373827.2, entitled "METHOD FOR OBTAINING DATA AND ELECTRONIC APPARATUS", filed with the Chinese State Intellectual Property Office on Aug. 23, 2013, and priority to Chinese Patent Application No. 201310590602.2, entitled "METHOD FOR PROCESSING MEDIA INFORMATION AND ELECTRONIC APPARATUS", field with the Chinese State Intellectual Property Office on Nov. 20, 2013, which are incorporated herein by reference in their entireties.

TECHNICAL FIELD

The present disclosure relates to the technical field of multimedia, and in particular to a method for processing data and an electronic apparatus.

BACKGROUND

With a rapid development of electronic technology, the electronic apparatuses are becoming more varied and humanized, and then the user experience is improved. Take cell phone for example, the current smart phone, with large storage space and capability of installing a variety of software, has become a minicomputer to some extent, and the functions thereof are becoming more humanized and elaborated.

A user may obtain a variety of files via an electronic apparatus, such as recording data, video file, text and picture.

However, the following problems are founded in the existing technology.

In the conventional technology, a user obtains files via an electronic apparatus, even if the user's operations are associated in terms of time, for example, the user may obtain recording data while obtaining text, these files are independent to each other, accordingly the user may look up these files respectively in the electronic apparatus; therefore, the workload of the electronic apparatus may be heavy.

SUMMARY

It is to provide a method for processing data and an electronic apparatus to solve the problem existing in the conventional technology that the workload of the electronic apparatus is heavy in a case that a user look up multiple files of an association relation in terms of time.

Firstly, a method for processing data applied to an electronic apparatus, includes: running a first application program on an operating system and obtain a first operation; calling a first service interface of the operating system according to the first operation and obtaining via the first service interface in real time multimedia data captured by a multimedia capture unit of the electronic apparatus; storing the multimedia data into a storage medium of the electronic apparatus in real time; obtaining a second operation in a process of capturing the multimedia data in real time; calling a second service interface of the operating system according to the second operation and obtain via the second service interface first data captured by a data capture unit of the electronic apparatus; establishing an association relationship between the first data and the multimedia data in terms of time; and generating second data in the case that the process of capturing the multimedia data is completed, where the second data includes the association relationship.

Preferably, in the process of capturing the multimedia data, an operating interface of the first application program displays a capture progress of the multimedia data and the first data.

Preferably, the establishing an association relationship between the first data and the multimedia data in terms of time includes: displaying a data identifier of the second data on a progress bar of the capture progress.

Preferably, the displaying the data identifier of the second data on the progress bar of the capture progress includes: determining a capture time of the first data; setting the data identifier on the progress bar according to the capture time.

Preferably, the displaying the data identifier of the first data on the progress bar of the capture progress includes: receiving a third operation of a user performed on a first location of the progress bar; responding to the third operation and setting the data identifier at the first location.

Preferably, before establishing an association relationship between the first data and the multimedia data in terms of time, the method further includes: obtaining an editing operation performed on the first data; responding to the editing operation and edit the first data to obtain modified second data; where the establishing an association relationship between the first data and the multimedia data in terms of time includes: establishing an association relationship between the edited first data and the multimedia data.

Preferably, after generating the second data, the method further includes: setting the first data as an index of the second data to facilitate the user obtaining the second data by searching the first data.

Preferably, the method further includes:
outputting the multimedia data;
outputting the first data according to the association relationship between the multimedia data and the first data in the process of outputting the multimedia data.

Preferably, first navigation information is time information of forming the multimedia data, the first navigation information includes multiple first navigation points, and each capture time point of the multimedia data corresponds to a first navigation point; where the second navigation information includes multiple second navigation points, and each piece of the first data corresponds to a second navigation point.

in the process of outputting the multimedia data, the method further includes:
displaying the first and the second navigation information on a display interface of the electronic apparatus;
in the process of displaying the first navigation information, the method further includes:
determining a capture time point of the multimedia data output currently and the current first navigation point corresponded to the capture time point;
identifying the current first navigation point at a location where the first navigation information is located in the display interface;
determining the current second navigation point corresponding to the first data output currently according to the association relation between the multimedia data and the first data;
identifying a location of the current second navigation point where the second navigation information is located in the display interface.

Preferably, the first navigation information is time information of forming the multimedia data, the first navigation information includes multiple first navigation points, and each first navigation point is configured to index a capture time point of the multimedia data, where second navigation information includes multiple second navigation points, and each piece of first data is corresponded to a second navigation point, where a capture time point of at least part of the multimedia data corresponds to a piece of the first data.

in the process of outputting the first data according to the association relationship between the multimedia data and the first data in the process of outputting the multimedia data includes:

outputting corresponding first data in the case that the capture time point of the at least part of the multimedia data is reached in the process of outputting the multimedia data;

in the process of outputting the multimedia data, the method further includes:

outputting the first and the second navigation information;

in the process of outputting the multimedia data, the method further includes:

detecting operation information for the first navigation information and determining a target first navigation point;

determining a target capture time point and target first data corresponding to the target capture time point according to the target first navigation point;

outputting the multimedia data at the target capture time point and outputting synchronously the target first data.

Preferably, the second navigation point is configured to index the first data, the method further includes:

detecting operation information for the second navigation information and determining a target second navigation point;

determining the target first data and the target capture time point of the multimedia data corresponding to the target first data according to the target second navigation point;

outputting the target first data and outputting synchronously the multimedia data at the target capture time point.

Preferably, the electronic apparatus has a first display mode and a second display mode, and the display interfaces of the display unit in the first and the second mode are different in display direction, where in the first display mode, the first and the second navigation information are located respectively a first and a second location of the display interface, the method further includes:

detecting that the electronic apparatus is switched from the first display mode to the second display mode;

combining the first and the second navigation information to form third navigation information and outputting the third navigation information on the display interface and marking the first navigation point corresponding to the capture time point of the at least part of the multimedia data.

An electronic apparatus is provided. The electronic apparatus includes: a first obtaining module, configured to run a first application program on an operating system and obtain a first operation; a first calling module, configured to call a first service interface of the operating system according to the first operation and obtain via the first service interface in real time multimedia data captured by a multimedia capture unit of the electronic apparatus; a storage module, configured to store the multimedia data into a storage medium of the electronic apparatus in real time; a second obtaining module, configured to obtain a second operation in a process of capturing the multimedia data in real time; a second calling module, configured to call a second service interface of the operating system according to the second operation and obtain via the second service interface first data captured by a data capture unit of the electronic apparatus; a establishing module, configured to establish an association relationship between the first data and the multimedia data in terms of time; and a generating module, configured to generate second data in the case that the process of capturing the multimedia data is completed, where the second data includes the association relationship.

Preferably, the electronic apparatus further includes: a display unit, configured to display a capture progress of the multimedia data and the first data on an operating interface of the first application program.

Preferably, the generating module is configured to display a data identifier of the second data on a progress bar of the capture progress.

Preferably, the generating module includes: a determining unit, configured to determine a capture time of the first data; a first setting unit, configured to set the data identifier on the progress bar according to the capture time.

Preferably, the generating module includes: a receiving unit, configured to receive a third operation of a user performed on a first location of the progress bar; a second setting unit, configured to respond to the third operation and then set the data identifier at the first location.

Preferably, the electronic apparatus further includes: a third obtaining module, configured to obtain an editing operation performed on the first data before the association relationship between the first data and the multimedia data in terms of time is established; a responding module, configured to respond to the editing operation and edit the first data to obtain modified second data; where the generating module is configured to establish an association relationship between the edited first data and the multimedia data.

Preferably, the electronic apparatus further includes: a setting module, configured to set the first data to as index of the second data to facilitate the user obtaining the second data by searching the first data after generating the second data.

Preferably, the electronic apparatus further includes:

a first output module, configured to output the multimedia data;

a second output module, configured to output the first data according to the association relationship between the first data and the multimedia data in the process of outputting the multimedia data.

Preferably, first navigation information is time information of forming the multimedia data, the first navigation information includes multiple first navigation points, and each capture time point of the multimedia data corresponds to a first navigation point; where the second navigation information includes multiple second navigation points, and each piece of first data corresponds to a first navigation point, where the electronic apparatus further includes:

a third output module, configured to output the first and the second navigation information to a display interface of the electronic apparatus in the case where the first output outputs the first media data;

a first determining module, configured to determine a capture time point of the multimedia data output currently and a current first navigation point corresponding to the capture time point in the process of outputting the multimedia data by the first output module;

a first identifying module, configured to identify the current first navigation point determined by the first determining unit at a location where the first navigation information is located in the display interface;

a second determining module, configured to determine the current second navigation point corresponding to the first data output currently in the case where the second output module outputs the first data according to the association relationship between the first and the multimedia data;

a second identifying module, configured to identify a location of the current second navigation point where the second navigation information is located in the display module.

Preferably, first navigation information is time information of forming the multimedia data, the first navigation information includes multiple first navigation points, and each first navigation point is configured to index a capture time point of the multimedia data, where second navigation information includes multiple second navigation points, and each piece of first data is corresponded to a second navigation point, where a capture time point of at least part of the multimedia data corresponds to a piece of the first data;

Preferably, the electronic apparatus further includes:

a third output module, configured to output the first and the second navigation media data in the case that the second output module outputs the multimedia data;

a first detecting module, configured to detect operation information for the first navigation information and then determine a target first navigation point;

a third determining module, configured to determine a target capture time point and target first data corresponding to the target capture time point according to the target first navigation point; and a fourth output module, configured to output the multimedia data at the target capture time point and output the target first data.

Preferably, the second navigation point is configured to index the first data, the electronic apparatus further includes:

a second detecting module, configured to detect operation information for the second navigation information and determine a target second navigation point;

a fifth determining module, configured to determine the target first data and the target capture time point of the multimedia data corresponding to the target first data according to the target second navigation point; and a sixth determining module, configured to output the target first data and output synchronously the multimedia data at the target capture time point.

Preferably, the electronic apparatus has a first display mode and a second display mode, and the display interfaces of the display unit in the first and the second mode are different in display direction, where in the first display mode, the first and the second navigation information are located respectively a first and a second location of the display interface, the electronic apparatus further includes:

a mode detecting module, configured to detect that the electronic apparatus is switched from the first display mode to the second display mode; and a navigation establishing module, configured to combine the first and the second navigation information to form third navigation information and output the third navigation information on the display interface, where the third navigation information includes multiple first navigation points, and the first navigation point corresponding to the capture time point of at least part of the data of the multimedia media data is marked.

The technical effect of the disclosure is shown as follows: in a case that the capture of multimedia file is in process, the first data may be obtained; in a case that the capture of multimedia file is completed, the association relationship between the first data and the multimedia data in terms of time may be established, and then the second data may be generated, hence the user only need to search the second data rather than to search the multimedia data and the first data respectively in searching the multimedia data and the first data, such that the workload of the electronic apparatus may be lightened, thereby reducing the time cost for the user to search the first data and the multimedia data and improving the user experience.

DETAILED DESCRIPTION

In the existing technology, the workload of electronic apparatus is heavy in a case that a user looks up multiple files associated in terms of time. In view of this, a method for processing data and an electronic apparatus are provided in a way that this problem in the exiting technology may be solved.

The technical solution provided according to the embodiments of the disclosure is to solve the above problem, and the general idea includes:

a method for processing data, applied in an electronic apparatus, where the electronic apparatus includes an operating system on which a first application program runs. The method includes: running the first application program on the operating system and obtaining a first operation; calling a first service interface of the operating system according to the first operation and obtaining via the first service interface in real time multimedia data captured by a multimedia capture unit of the electronic apparatus; storing in real time the multimedia data captured by the multimedia capture unit of the electronic apparatus into a storage medium of the electronic apparatus; obtaining a second operation in real time during capturing the multimedia data in real time; calling a second service interface of the operating system according to the second operation and obtaining via the second service interface first data captured by a data capture unit of the electronic apparatus; establishing an association relationship between the first data and the multimedia data in terms of time; generating second data including the association relationship.

In the above technical solution, in a case that the capture of multimedia data is in process, the first data may be obtained; in a case that the capture of multimedia file is completed, the association relationship between the first data and the multimedia data in terms of time may be established, and then the second data may be generated, hence the user only need to search the second data rather than to search the multimedia data and the first data, respectively, such that the workload of the electronic apparatus may be reduced, thereby reducing the time cost for the user to search the first data and the multimedia data and improving the user experience.

The technical solutions according to the embodiments of the disclosure will be specified in conjunction with drawings and embodiments. It should be understood that, the disclosed embodiments are a few of the embodiments of the disclosure, rather than all of the embodiments. Without conflict, the embodiments and the technical features of the disclosure may be combined with each other.

Firstly, a method for processing data is provided according to an embodiment of the disclosure, which is applicable in an electronic apparatus, where the electronic apparatus includes an operating system on which a first application program runs. The electronic apparatus may be laptop, tablet, cell phone, etc.

Figure 1:
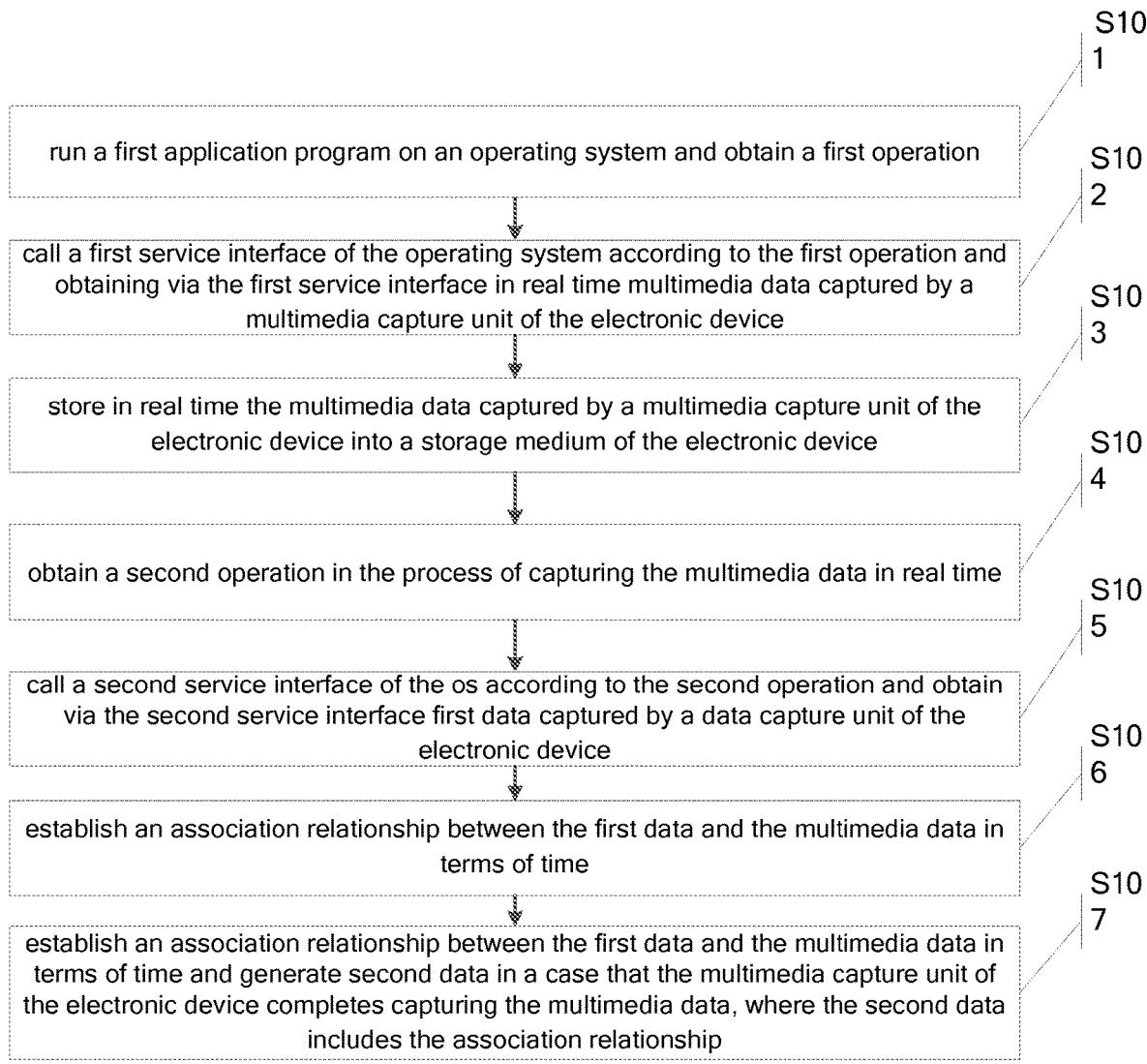
FIG. 1 is a flow chart of a method for processing data provided according to an embodiment of the disclosure.

As shown in FIG. 1, the method for processing data includes steps 101 to 107.

S101 is to run the first application program on the operating system and obtain a first operation.

S102 is to call a first service interface of the operating system according to the first operation and obtaining via the first service interface in real time multimedia data captured by a multimedia capture unit of the electronic apparatus.

S103 is to store in real time the multimedia data captured by the multimedia capture unit of the electronic apparatus into a storage medium of the electronic apparatus.

S104 is to obtain a second operation in real time during capturing the multimedia data.

S105 is to call a second service interface of the operating system according to the second operation and obtain via the second service interface first data captured by a data capture unit of the electronic apparatus.

S106 is to establish an association relationship between the first data and the multimedia data in terms of time.

S107 is to generate second data including the association relationship.

In the process of implementation, the first operation in S101 may be any predetermined operation, such as clicking a predetermined button or generating a predetermined gesture, and that may not be limited by the embodiment of the disclosure.

In the process of implementation, the multimedia data in S102 may include the multimedia data of a certain duration played in stream, such as video data, audio data, and that may not be limited by the embodiment of the disclosure.

The first service interface to be called depends on the type of the multimedia data. For example, in the case that the multimedia data is video data, the first service interface may be a camera interface, and then the multimedia capture unit is a camera; in the case that the multimedia data is audio data, the first service interface may be an audio capture apparatus interface, and then the multimedia capture unit is an audio capture apparatus, and the embodiment of the disclosure is not limited in this aspect.

In the process of implementation, the storage medium in S103 may be memory, cache, etc.

In the process of implementation, the second operation in S104 may be any operation, such as generating a predetermined gesture, calling a toolbar and clicking a predetermined button on the toolbar, and the embodiment of the disclosure is not limited in this aspect.

In the process of implementation, in the case that the multimedia data and the first data call different service interfaces, for example, the multimedia data is audio data, and the first service interface called by the multimedia data is a microphone interface, the first data is image data, and the second service interface called by the image data is a camera interface, and then the second operation may be to start the camera; in the case that the multimedia data and the first data call a same service interface, for example, the multimedia data is image data, and the second service interface called by the image data is a camera interface, in this case the second operation may be to click a predetermined button on the camera, for example, to click a capturing button on the camera.

In the process of implementation, there may be many types of the first data in S105, and two of them will be introduced in the following, however, the implementation will not be limited in the two types.

In one case, the first data is text. In the case that a user clicks a text input button on a toolbar, a text input interface may be provided on the first application program for the user to input text, where the text may include any content, such as "Monday: draft; Tuesday: effect picture; Wednesday: complete".

In another case, the first data is image data, where the image may be called via an image edit button, obtained from scrawl, or captured by an image capture apparatus, and the embodiment of the disclosure is not limited in this aspect.

In a further preferable embodiment, an operating interface of the first application program displays a capture progress of the multimedia data and the first data in the process of capturing in real time the multimedia data.

In the process of implementation, the capture progress is shown in different ways, such as via a duration displayed on the progress bar or via an audio track, and the embodiment of the disclosure is not limited in this aspect. And the first data may be displayed while the capture progress is being shown, such as displaying a text or an image.

In the process of implementation, the process of establishing the association relationship between the first data and the multimedia data in terms of time in S106 may be implemented in different ways, and two of them will be introduced in the following, however, the implementation will not be limited in the two ways.

In one way, the process of establishing the association relationship between the first data and the multimedia data in terms of time includes: displaying on a progress bar of the capture progress a data identifier of the second data.

In the process of implementation, the data identifier is displayed on the progress bar in different ways, and two of them will be introduced in the following, however, the implementation will not be limited in the two ways.

Figure 2:
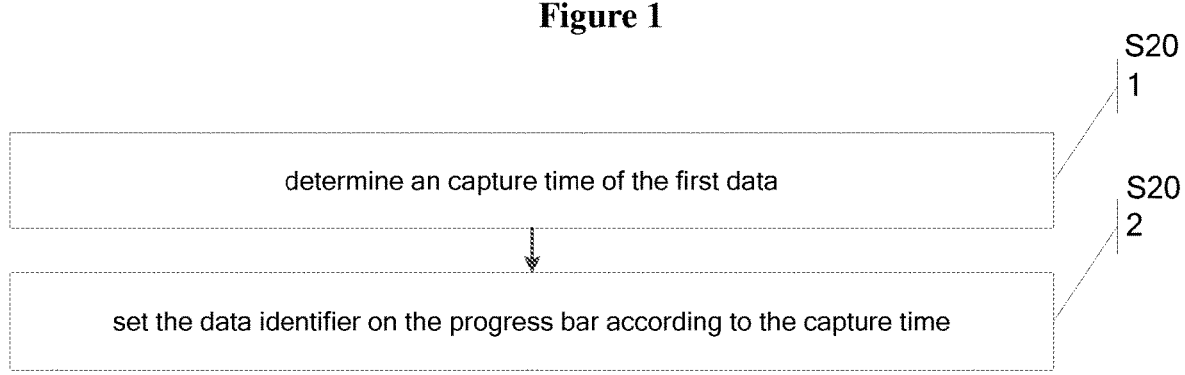
FIG. 2 is a flow chart of the first method for setting a data identifier of second data in a method for processing data provided according to an embodiment of the disclosure.

1. As shown in FIG. 2, the process of displaying the data identifier of the second data on the progress bar of the capture progress includes the steps S201 to 202.

S201 is to determine capture time of the first data.

S202 is to set the data identifier on the progress bar according to the capture time.

In the process of implementation, a possible way is to set a time identifier immediately on the progress bar while capturing the first data, and then the capture time may be determined based on the current time; another possible way is to record the capture time of the first data while capturing the first data, rather than to insert the first data into the progress bar immediately. The data identifier may be inserted into to a location corresponding to the capture time on the progress bar.

For example, in the case that the multimedia data starts at 19:00 and ends at 20:00, and the capture time of the first data is 19:30, and then the data identifier of the first data may be inserted into the middle of the progress bar of the multimedia data.

According to the above solution, the data identifier may set for the first data in the second data according to the capture time of the first data, i.e., such that the capture progress of the multiple data of the second data may be reproduced. Therefore, the user does not need to drag and view the second data repeatedly when viewing the second data, and then the workload of the electronic apparatus may be lightened.

Figure 3:
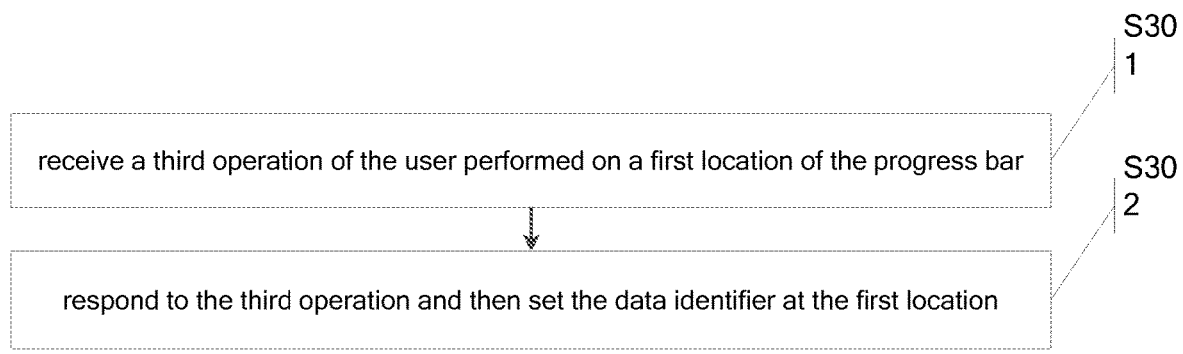
FIG. 3 is a flow chart of the second method for setting a data identifier of the second data in a method for processing data provided according to an embodiment of the disclosure.

2. As shown in FIG. 3, the process of displaying the data identifier of the second data on the progress bar of the capture progress includes steps S301 to S302.

S301 is to receive a third operation of the user performed on a first location of the progress bar.

S302 is to respond to the third operation and then set the data identifier at the first location.

In the process of implementation, the third operation in S301 may be any operation, such as clicking or dragging, and the embodiment of the disclosure is not limited in this aspect.

In the process of implementation, in S302, the processes of responding to the third operation and then setting the data identifier may be implemented in different ways. For example, in the case that the second operation is clicking, the data identifier may be set at a location where the clicking is performed; in the case that the second operation is dragging, the data identifier may be set a location where the dragging is ended. The embodiment of the disclosure is not limited in how to set the data identifier.

According to the above solution, a file identifier may be further set based on the third operation of the user, and then the user may set the file identifier to be convenient for viewing, hence the user may view the second data more conveniently and reducing the time cost for view the second data.

In addition, in the process of implementation, the above two solutions may be combined to set the data identifier, i.e., the first step is to set the data identifier of the second file based on the capture time of the second file, and then the location of the data identifier may be modified by the second operation of the user.

In the second way, the process of establishing an association relationship between the first data and the multimedia data in terms of time includes: inserting the first data into the multimedia data at the time point when the first data is captured.

Another way is to insert the first data into the multimedia data directly more than to set a data identifier for the first data on the progress bar of the multimedia data. For example, in the case that the multimedia data is audio data which starts at 19:00 and ends at 20:00, and the first data is image data which is captured at 19:30, and then the image data may be inserted into the audio data at the middle time of the duration of capturing the audio data.

Figure 4:
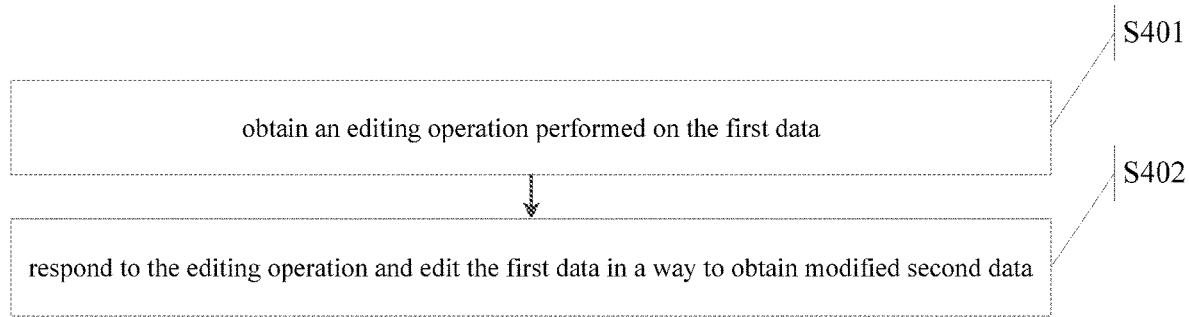
FIG. 4 is a flow chart of a method for editing first data in a method for processing data provided according to an embodiment of the disclosure.

In a further preferable embodiment, before S106, as shown in FIG. 4, the method further includes step S401 to S402.

S401 is to obtain an editing operation performed on the first data.

S402 is to respond to the editing operation and edit the first data to obtain modified second data.

In the process of implementation, the editing operation depends on the type of the first data. For example, in the case that the first data is text, the editing operation may be to adjust the size, effect and font of the text, etc. in a case that the first data is image, the editing operation may be to adjust the size and tone of the image and to add frames to the image. The embodiment of the disclosure is not limited in this aspect.

The process of establishing an association relationship between the first data and the multimedia data in terms of time further includes: establishing an association relationship between the edited first data and the multimedia data.

That is to say, in the process of establishing an association relationship between the first data and the multimedia data in terms of time, the first step is to adjust the data in a way that the display effect may be better in the case that the first data and the multimedia data are combined to be the second data.

In a further preferable embodiment, the method after S107 further includes: setting the first data as an index of the second data in a way that the user may obtain the second data after searching based on the first data.

In the process of implementation, the process of setting the first data as an index of the second data may vary in different cases, and two of them will be introduced in the following, however, the implementation will not be limited in the following two cases.

In one case, the first data is set to be indexing data for the second data in a way that the user may obtain the second data after searching the first data as a key word.

In another case, the first data is set as a LOGO of the second data in a way that the user may identify the second data via the first data.

For example, in a case that the first data is an image, and then the image may be set to be a display LOGO of the second data, hence the user may confirm that the data corresponding to the LOGO is the second data after finding the display LOGO. In a case that the first data is text, and then a LOGO image may be generated based on the text. For example, part of the characters of the first data are selected to be set on a background image in a way that the LOGO image may be generated, and then the LOGO image may be set as the display LOGO of the second data in a way that the user may confirm the second image according to the display LOGO. The embodiment of the disclosure is not limited in this aspect.

In a further preferable embodiment, in the process of capturing in real time the multimedia data, multiple first data may be captured at different time points, and then the association relationship may be established between the multimedia data and the multiple first data. In this case, the multiple first data may be set with different identifier on the progress bar of the multimedia data (e.g., the identifier may be a key word or part of the first data), hence it may be convenient for the user to search the different first data.

In the process of implementation, in S107, the generated second data may vary in different cases, and two of them will be introduced in the following, however, the implementation will not be limited in the following two cases.

In one case, the second data only includes the multimedia data and the identifier of the first data but does not includes the first data, and then first data may be called via the data identifier in a way the first data may be played. For example, the first data is an image and the multimedia data is audio data, and then the second data is still audio data.

In another case, the second data includes the multimedia data, the first data and the association relationship, i.e., they generate a new multimedia data. For example, the first data is an image and the multimedia data is audio data, and then the first data and the multimedia data may be combined to generate video data.

In a further preferable embodiment, after the second data is generated in S107, the method further includes: receiving the user's operation for playing the second data and then playing the multimedia data in time order in the case that the second data is generated, and playing the first data.

In the process of implementation, the first data may be played in different ways, and two of them will be introduced in the following, however, the implementation will not be limited in this aspect.

In one way, in the case that a time bar reaches the capture time point of the first data, the first data may be played automatically. In an example, the multimedia data is recording data, and the first data is text, where the duration of the multimedia data is 1 h, and the text is inserted into the multimedia data at the 30th minute. After responding to the user's operation, the electronic apparatus may first play the recording data and then play the first data at the 30th minute. For example, the following contents may be displayed on the display unit: Monday: draft; Tuesday: effect picture; Wednesday: complete.

Furthermore, in the case that multiple first data is inserted into the multimedia data, for example, a text is inserted at the 30th minute, an image is inserted a the 40th minute, and then the electronic apparatus may display the text on the display unit after playing the text and then replace the text with the image at the 40th minute. In another example, after playing the text for a predetermined duration such as 2 min or 3 min, the text may be cleared in a way to display the next piece of first data.

In another case, the electronic apparatus may respond to the clicking operation of the user and then display the first data.

Only the multimedia data is provided for the user when playing the second data. If the user intends to play the first data, the user may click the corresponding data identifier.

The data identifier may be displayed on the displaying interface of the second data for the user to click.

A progress bar may be provided on the display interface of the second data, and the data identifier of the first data may be displayed on the progress bar. In this case, the first data may be played so long as the clicking operation is responded, in regardless of how long the playing of the second data lasts.

A progress bar may be set on the second data when playing the second data, and then the user may view the first data after the electronic apparatus responds the user's operation, and then the time cost for viewing the first data may be reduced, and the way of viewing the first data is flexible, thereby improving the user experience.

In the process of implementation, the first data and the multimedia data may be played at different time. For example, when playing the first data, the playing of multimedia data may suspended. In this case, the first data and the multimedia data may be played by the same hardware device of the electronic apparatus. For example, the first data is music, and the second data is a recording, and then the electronic apparatus may play both the first data and the multimedia data on the loudspeaker unit thereof; hence the electronic apparatus may suspend playing the multimedia data when playing the first data. For another example, the first data is an image, and the multimedia data is a video, in this case, and then the electronic apparatus may play both the first data and the multimedia data on the display unit thereof, hence the electronic apparatus may suspend playing the multimedia data when playing the first data. The first data and the multimedia data may be played simultaneously. For example, the multimedia data is recording, and the first data is a text, and then it may not be conflict to play the first data and the multimedia data simultaneously, i.e., the first data and the multimedia data may be played simultaneously. In the process of implementation, a setting interface may be provided to the user, by which the users may determine whether to play the first data and multimedia data simultaneously. The implementation will not illustrate and not be limited in this aspect.

Embodiment 1

In this embodiment, the electronic apparatus is a cell phone, and a method for processing data will be specified in the following.

Figure 5A:
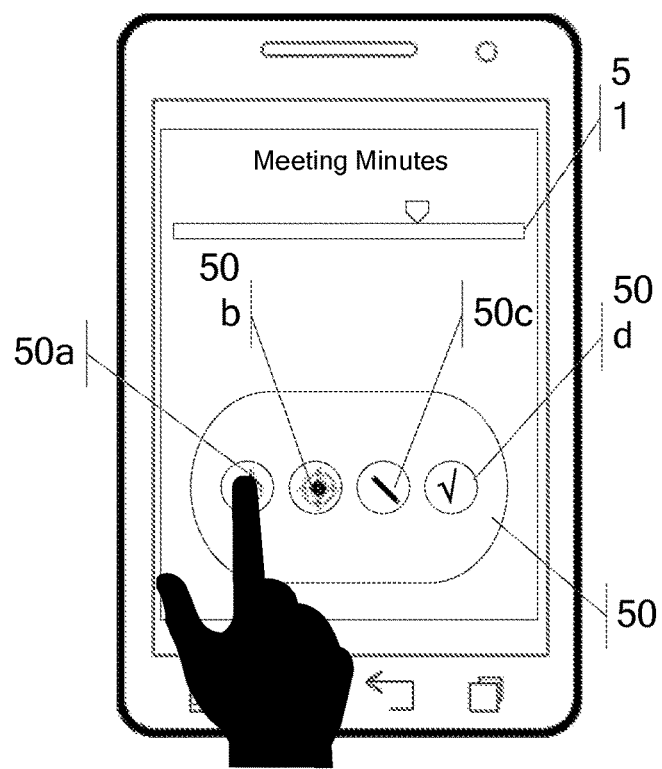
FIG. 5a is a schematic diagram of calling a tool bar on a note of a cell phone provided according to embodiment 1 of the disclosure.

At time point T1, user A is at a meeting and intends to take a note, and the user may click any blank area of the note, and then the cell phone may respond to the user's operation. As shown in FIG. 5a, a tool bar 50 may be called, where the tool bar 50 includes buttons for generating multiple different second files, including a recording button 50a, a camera button 50b, a writing button 50c and a drawing button 50d.

The user may slide a finger to the recording button 50a and then release the finger, and then the cell phone may detect the user's operation and start a recording mode in a way to capture the note in a way of recording, and a progress bar 51 may be displayed on the top of the note, as shown in FIG. 5a.

Figure 5B:
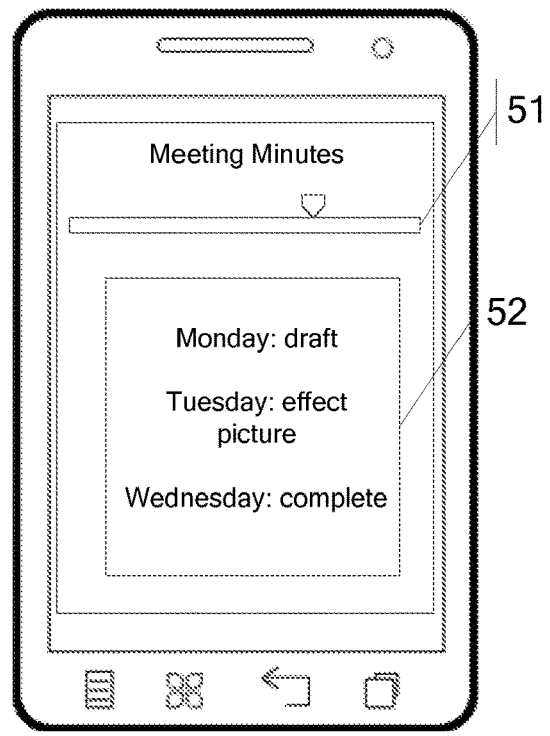
FIG. 5b is a schematic diagram of calling a handwriting interface on a note of a cell phone provided according to embodiment 1 of the disclosure.

At time point T2, user A intends to insert a handwriting record into the note, the user may click any blank area of the note, and then the cell phone may respond to the user's operation and then call the tool bar 50. After that the user may slide a finger to a handwriting button 50c and then call a handwriting interface 52, as shown in FIG. 5b.

Figure 5C:
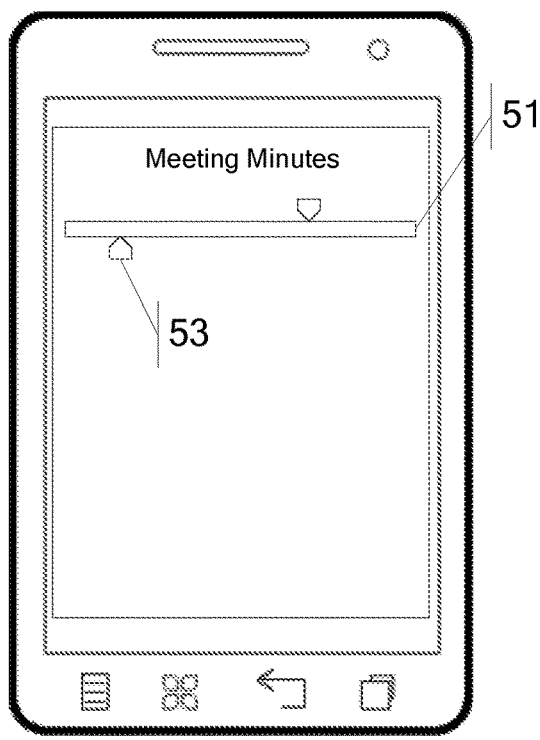
FIG. 5c is a schematic diagram of setting a first anchor point in a progress bar of the note provided according to embodiment 1 of the disclosure.

The user A writes the following contents at the handwriting interface 52: Monday: draft; Tuesday: effect picture; Wednesday: complete; after that user clicks a "Enter" button to complete the operation, meanwhile a first anchor point 53 which is corresponded to the completion time of the handwriting may be set on the progress bar 51, as shown in FIG. 5c.

Figure 5D:
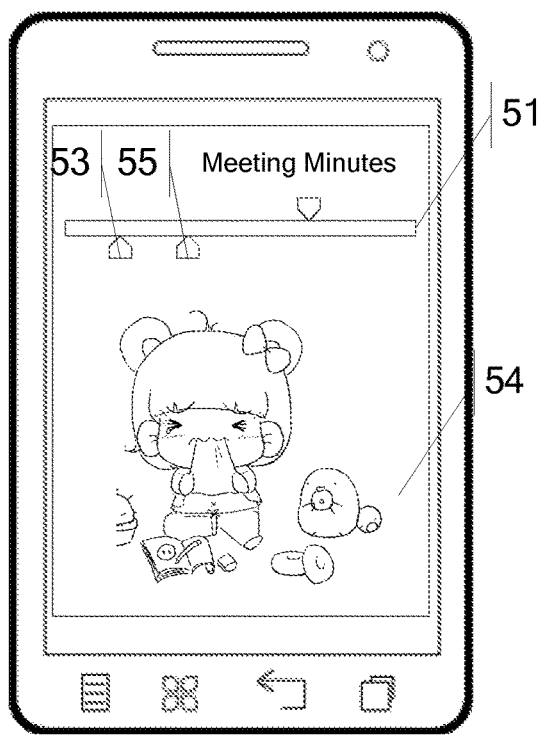
FIG. 5d is a schematic diagram of setting a second anchor in a progress bar of the note provided according to embodiment 1 of the disclosure.

At time point T3, user A intends to insert a picture into the note, the user may click any blank area of the note, and then the cell phone may respond to the user's operation and then call the tool bar 50. After that the user may slide a finger to the camera button 50b and then release the finger in a way to switch on the camera to capture a picture 54, meanwhile a second anchor point 55 which is corresponded to the completion time of the capturing may be set on the progress bar 51, as shown in FIG. 5d.

At time point T4, user A completes the recording and then combines the recording, the handwriting and the picture to make the note.

Figure 5E:
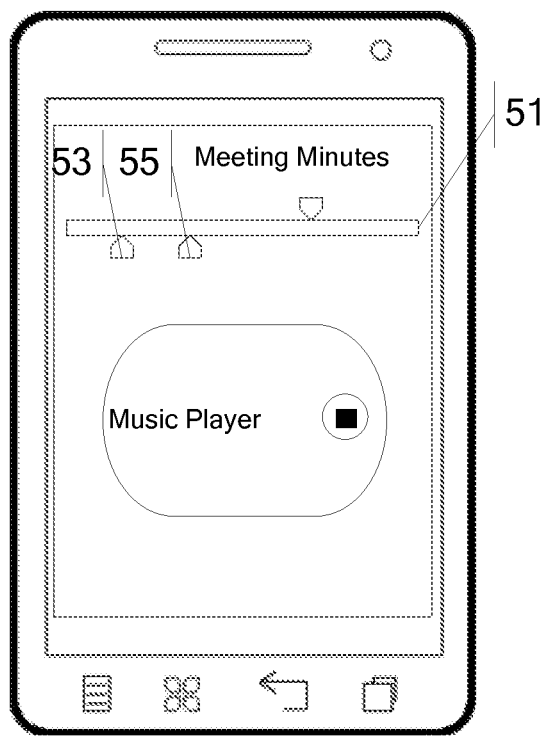
FIG. 5e is a schematic diagram of an cell phone interface in playing the note is a schematic diagram of setting a first anchor in a progress bar of the note provided according to an embodiment of the disclosure.

At time point T5, user A intends to check the above note. User A may click the button for playing the note and then the note may be played in time order, meanwhile a progress bar 52 may be displayed on the top of the display unit, where the progress bar 51 includes the first anchor 53 and the second anchor 55, as shown in FIG. 5e.

At time point T6, user A clicks the second anchor 55, and then the captured picture 54 may be displayed on the top of the display unit. Since it is not conflict to play the picture 54 and the recording simultaneously, there is no need to suspend playing the recording.

At time point T7, the handwriting may be played automatically at the corresponding time point. The following contents may be displayed on the top the display unit: Monday: draft; Tuesday: effect picture; Wednesday: complete.

Embodiment 2

In this embodiment, the electronic apparatus is a tablet PC.

At time point T8, user B makes a new note.

Figure 6A:
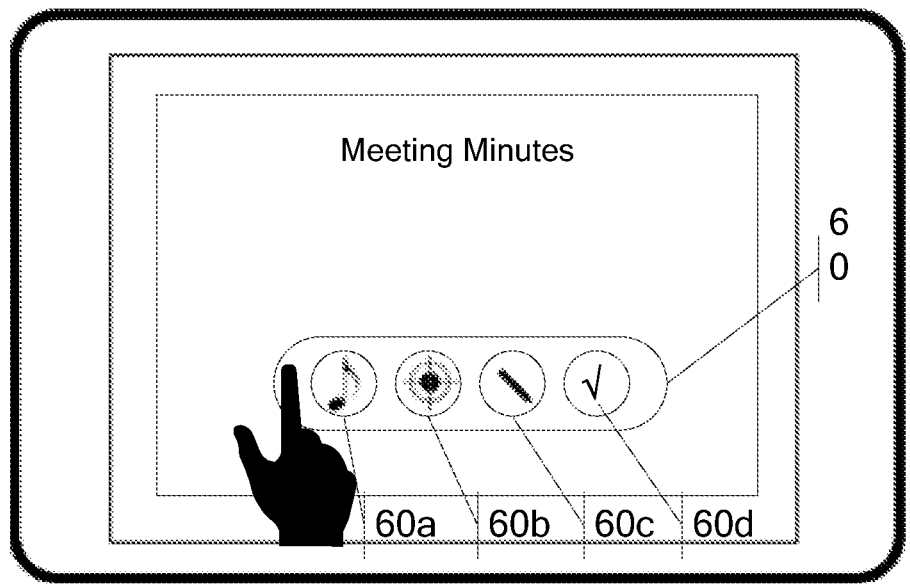
FIG. 6a is a schematic diagram of calling a tool bar on a note of a table PC is a schematic diagram of setting a first anchor in a progress bar of the note provided according to an embodiment of the disclosure.

At time point T9, user B clicks the black area of the note, and the tablet PC responds to the user' operation, as shown in FIG. 6a, and then a tool bar 60 may be displayed on the note, where the tool bar 30 includes: a recording button 60a, a camera button 60b, a handwriting button 60c and a drawing button 60d.

Figure 6B:
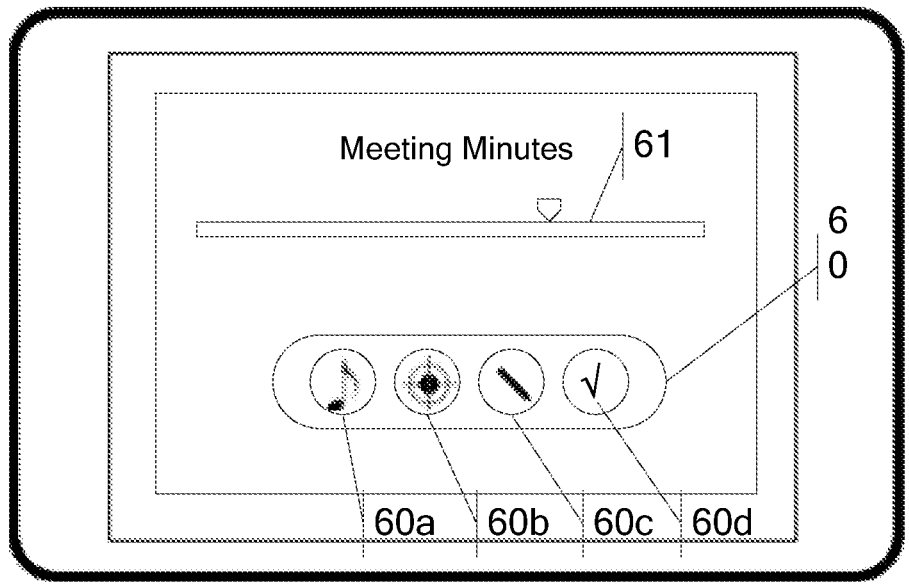
FIG. 6b is a schematic diagram of inserting a recording into the note and displaying a progress bar on the note provided according to embodiment 2 of the disclosure.

At the time point T10, user B slides a finger to the recording button 60a, and then a recording interface may be displayed on the display unit of the tablet PC, and a progress bar 61 may be displayed on the top of the note, as shown in FIG. 6b.

Figure 6C:
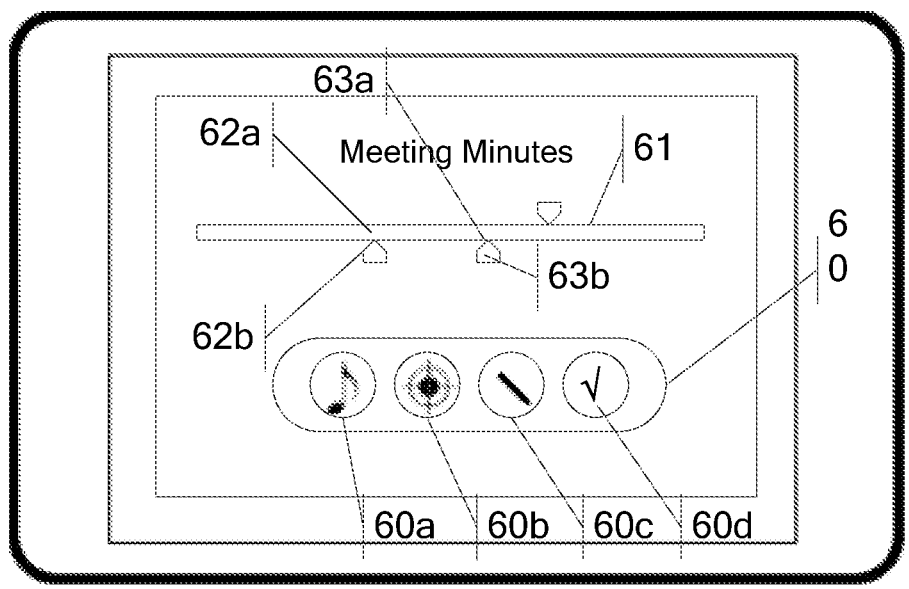
FIG. 6c is a schematic diagram of setting a first anchor corresponded to a first image and a second anchor corresponded to the scrawl on the note provided according to embodiment 2 of the disclosure.

At time point T11, as shown in FIG. 6c, user B may call the tool bar 60 and click the camera button 60b on the tool bar 60 to switch on the camera of the tablet PC. After that, a first image may be captured by the camera and be inserted in to the note, and a first anchor 62b which corresponds to the first image may be inserted into the first location 62a on the progress bar 61.

At time point T12, as shown in FIG. 6c, user B may call the progress bar 61 and then obtain a scrawl by calling the drawing button 60d on the progress bar 61, and insert a second anchor point 63b which corresponds to the scrawl into the second location 63a on the progress bar 61.

Figure 6D:
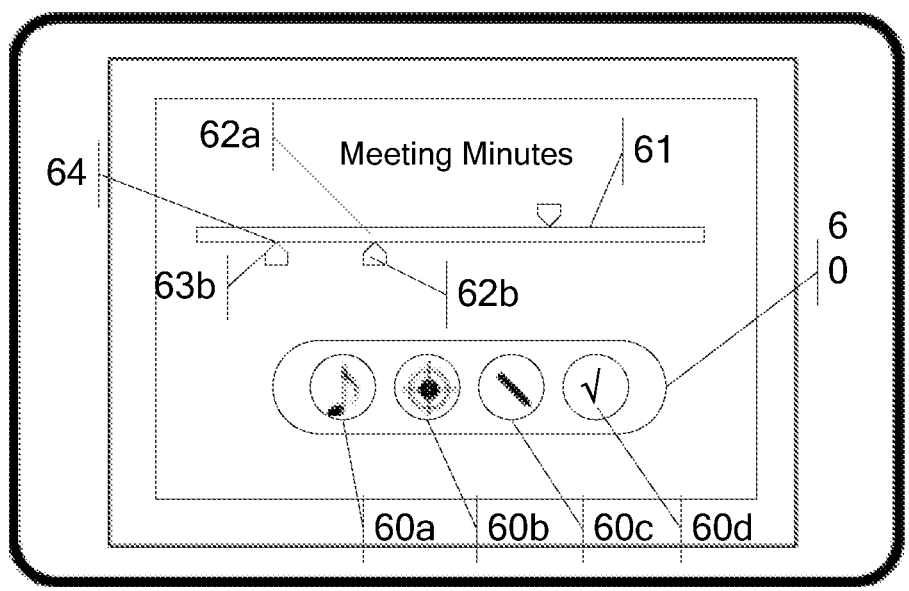
FIG. 6d is a schematic diagram of adjusting the locations of the first and the second anchors in the note.

The time to capture the first data is prior to the time to capture the scrawl, hence the first location 62a which corresponds to the first anchor 62b is front of the second anchor 63a which is corresponded to the second anchor 63b, however, the user intends to play the scrawl first when playing the note, and then the user may slide the second anchor 63b to a third location 64 which is front of the first location 62a. After detecting the user's operation, the tablet PC may set the second anchor 63b at the third location 64, as shown in FIG. 6d, and then the user may completed editing the note.

At time point T13, user A intends to play the note and then open the note and play the note in time order.

Figure 7:
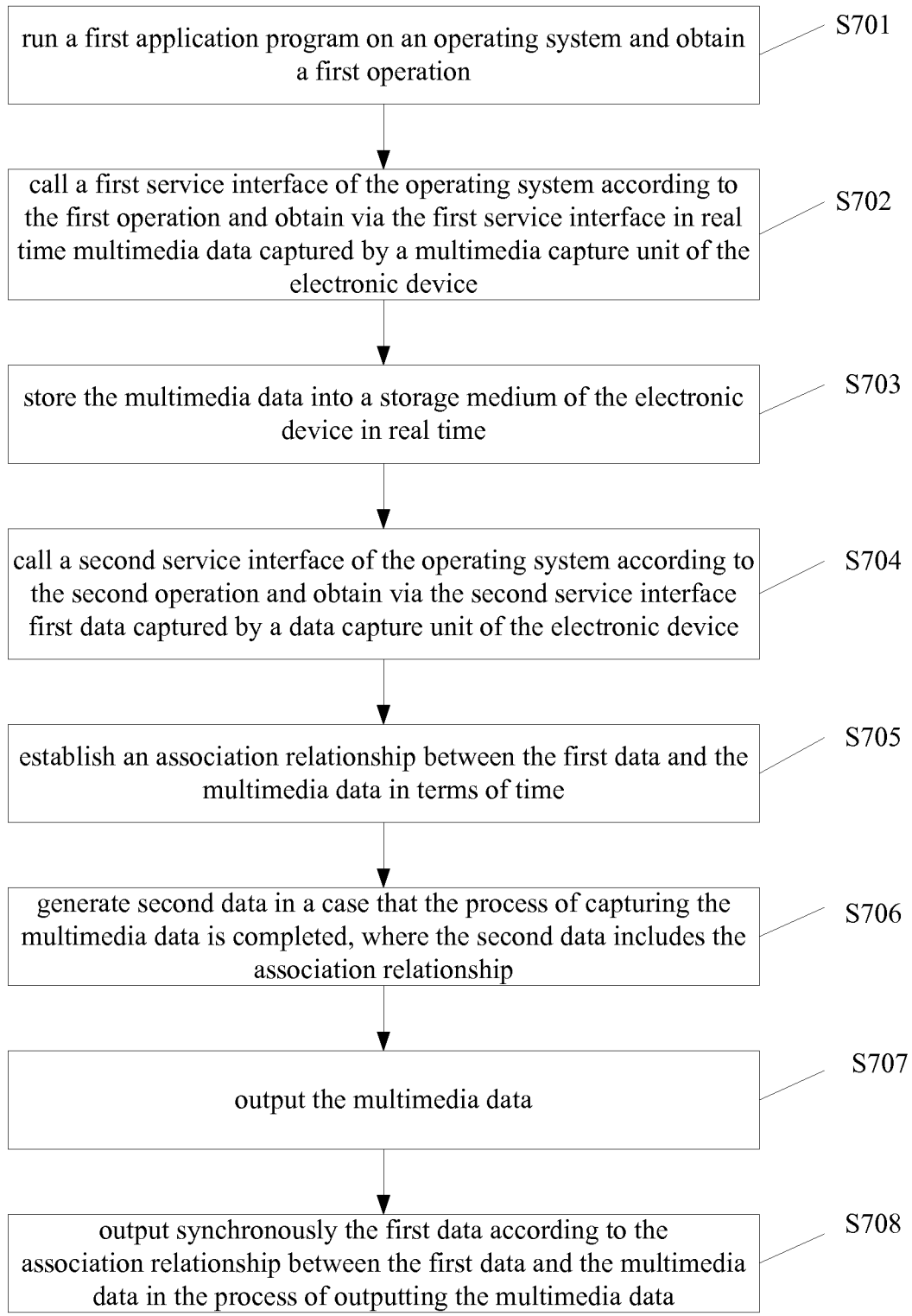
FIG. 7 is a schematic diagram of another method for processing data provided according to an embodiment of the disclosure.

Another method for processing data is provided according to an embodiment. As shown in FIG. 7, the method includes steps S701 to S709.

S701 is to run a first application program on an operating system and obtain a first operation.

S702 is to call a first service interface of the operating system according to the first operation and obtain via the first service interface in real time multimedia data captured by a multimedia capture unit of the electronic apparatus.

S703 is to store the multimedia data into a storage medium of the electronic apparatus in real time.

S704 is to obtain a second operation in the process of capturing the multimedia data in real time.

S705 is to call a second service interface of the operating system according to the second operation and obtain via the second service interface first data captured by a data capture unit of the electronic apparatus.

S706 is to establish an association relationship between the first data and the multimedia data in terms of time.

S707 is to generate second data in a case that the process of capturing the multimedia data is completed, where the second data includes the association relationship.

S708 is to output the multimedia data.

S709 is to output synchronously the first data according to the association relationship between the first data and the multimedia data in the process of outputting the multimedia data.

In this embodiment, the multimedia data may be the first media data captured continuously in terms of time, where the first media data may be the second media data which is captured discretely in terms of time. When outputting the first media data, the electronic apparatus may output the second media data synchronously according to an association relationship between the first and the second media data. The attribute parameters of the first and the second media data are different. In this embodiment, the different types of media data may be output simultaneously in a way to output different types of information, and information carried respectively by the first and the second media data may be associated, hence the information may be spread effectively and better understood, and the information may be more diverse and interesting.

The technical solution of the embodiment may be applicable to electronic apparatus, and the attribute parameters of the first and the second media data are different.

The attribute parameter may include type of media data configured to distinguish different types of media data. For example, the attribute parameter may include audio, video, image and text, etc.

The first media data may be captured continuously in terms of time, and the contents of the data captured at the adjacent capture time points in the first media data are associated with each other, which may form continuous contents. The first media data may be output continuously according to a sequence of capture time. The attribute parameter of the first media data may be audio and video, etc.

The second data is captured discretely in terms of time, and the contents of the data captured at different capture time points in the second media data may be not associated with each other, which may be independent to each other and may be output respectively. The attribute parameter of the second media data may be image and text, etc.

As a possible way of implementation, the first media data may be audio data, where the audio data is captured continuously in terms of time in a way to form continuous audio information.

The second media data may include image data and text data, or media data combined of image and text.

There is an association relationship between the first and the second media data. In the process of outputting the first media data, since the first media data is captured continuously in terms of time with a certain outputting duration, the second media data may be output synchronously according to the association relationship. The second media data may be output after part of the first media data is output or be output after the outputting time reaches a certain capture time point.

Therefore, the association relationship may be a corresponding relation between the outputting duration of the first and the second media data, or a corresponding relation between the contents of the first and the second media data. That is to say, the different second media data captured discretely may be corresponded to part of the first media data, or may be corresponded to the capture time point of part of the first media data.

As a possible way of implementation, the association relationship may be predetermined, and it is regulated that at least part of the data of the first media data captured continuously in terms of time or at least part of the capture time points is corresponded to a piece of second media data respectively. For example, the first media data is audio data with an outputting duration of 60 s captured continuously in terms of time, and then the first media data may be predetermined to be corresponded to second media data at the 0 second, the 10th second and 50th second respectively.

As another possible way of implementation, the association relationship between the first and the second media data is formed in the process of obtaining the second media data captured discretely in terms of time in the process of capturing the first media data continuously in terms of time.

That is to say, in the process of capturing the first media data, the second media data may be captured simultaneously at certain time points which are discrete to each other, without suspending capturing the first media data. For example, the second data may be captured respectively at the 0 second, the 10th second and the 50th second in the process of capturing the first media data, hence the association relationship between the first and the second media data may be set according to the corresponding relation of capture time, in a way that the second media data captured respectively at the 0 second, the 10th second and the 50th second may be output at the 0 second, the 10th second and the 50th second in the process of outputting the first media data.

In the process of capturing the first media data, the association relationship between the first and the second media data may be established in the process of capturing the second media data at certain capture time points, and the first and the second media data may further be edited, such as deleting the unqualified data.

Therefore, in a possible way of implementation, the data within certain capture duration may be deleted in the process of editing the first media data. In a case that there exits second media data which is captured in the time duration of the deleted first media data, a new corresponding relation between the second media data and the first media data may be established. For example, the second media data is captured respectively at the 0 second, the 10th second and the 50th second in the process of capturing the first media data, where the capture duration of the first media data is 60 s. In the process of editing, the data captured between the 40th second and the 60th second may be deleted. Since there exits second media data captured at the 50th second, a new outputting relation between the first media data and the second media data captured at the 50th second may be established.

For example, the second media data captured at the 50th second is corresponded to a capture time point at the 40th second of the first media data. The second media data captured respectively at the 0 second and the 10th second is still corresponded respectively to the capture time points at the 0 second and the 10th second of the first data.

Alternatively, the second media data captured at the 50th second is corresponded to the capture time point at the 0 second of the first media data. In a case the outputting of first media data is completed, the first media data may be output again from the 0th second, at this point, the second media data corresponded to the 0th second is just the second media data captured at the 50th second.

In this association relationship, a certain capture time point or certain output data of the first media data may be corresponded to second media data or multiple second media data. For example, there may be multiple second media data which are captured simultaneously at the 10th second of the first media data. Therefore, in the process of outputting the first media data, the multiple second media data can be output simultaneously at a certain time point. In a case that there is a time order in the multiple second data, the 0th second of the first media data may be corresponded respectively to the second media data captured at the 0th second and the 50th second of the second media data.

In addition, in a case that the second media data is image or text, the second media data may be output to the display interface by means of animation.

In this embodiment, for the media information such as the first media data captured continuously in terms of time and the second media data captured discretely in terms of time, when the electronic apparatus outputs the first media data, the second media data may be output synchronously according to the association relationship between the first and the second media data. The attribute parameters of the first and the second media data are different. In this embodiment, the media data with different types may be output simultaneously, and the information carried respectively by the first and the second media data may be associated, hence the information may be spread effectively and better understood. For example, in a case that the first media data is an audio, and second media data includes image and/or text, the image and/or text may be played with the audio, and then the audio information may be better understood and the information may be more diverse and interesting.

In an implementation of the embodiment of the disclosure, the first and the second media data included in the media information may be stored, and the first and the second media data of different attribute parameters are integrated to form a media record. In the process of outputting this media record, the first and the second media data may be output synchronously at different time points according to the association relationship.

The way to output the first media data may be calling the media record by the electronic apparatus and then outputting the first media data in the media record. In addition, in the process of outputting the first media data, the second media data in the media record may be output synchronously.

The media record may be formed in the process of capturing data. That is to say, in the process of capturing continuously in terms of time the first media data, when the second media data is captured at certain capture time points, the first and the second media data may be integrated and stored as one media data by establishing an outputting relation between the first and the second media data.

An operating interface may be displayed by the electronic apparatus. After receiving a first processing instruction of the media information via the operating interface, the electronic apparatus may start up at least two input units to capture the first and the second media data and then establish a media record. After receiving a second processing instruction of the media information via the operating interface, the electronic apparatus may call the established media record and then output the first media data in the media record.

The electronic apparatus may start up at least two input units to capture the first and the second media data, where the input unit may be an image capture unit, an audio capture unit or a text input unit, etc. The image capture unit may be a camera of the electronic apparatus, the audio capture unit may be a microphone of the electronic apparatus, and the text input unit may be a key board of the electronic apparatus.

FIG. 8 is a flow chart of another method for processing data provided according to an embodiment of the disclosure. Media information includes first media data captured continuously in terms of time and second media data captured discretely in terms of time, where the attribute parameters of the first and the second media data are different.

In this embodiment, the media information includes first navigation information and second navigation information. The first navigation information consisting of multiple first navigation points is time information of forming the first media data, and each first navigation point is configured to index a capture time point of the first media data, and multiple first navigation points form continuous first navigation information.

The second navigation information includes multiple second navigation points, and each piece of second media data corresponds to a second navigation point, i.e., each piece of the second media data corresponds to a second navigation point.

The capture time point of at least part of the first media data is corresponded to a piece of the second media data.

Since the second media data is captured discretely in terms of time, each second navigation point may correspond to a capture time point of the second media data.

Since each piece of the second media data corresponds to a second navigation point, and the capture time point of at least part of the first media data corresponds to a piece of the second media data, as a possible way of implementation, each second navigation point may correspond to a capture time point of the first media data, and the capture time points of the first media data may include the capture time point of the second media data.

In this embodiment, the detailed description of a process of capturing data is omitted herein, and a process of outputting data is shown in FIG. 8.

S801 is to output first media data, first navigation information and second navigation information.

In this embodiment, in the process of outputting the first media data, the first navigation information and the second navigation may be output simultaneously.

In the process of outputting the first media data, the first and the second navigation information may be displayed on a display interface of the electronic apparatus.

S802 is to output the corresponding second media data in the process of outputting the first media data when the capture time point of at least part of the data is reached.

In this embodiment, an association relationship between the first and the second media data is that each capture time point of at least part of the first media data is corresponded respectively to a piece of the second media data.

Similarly, the association relationship may be predetermined.

The association relationship may be also formed in the process of obtaining the second media data captured discretely in terms of time in the process of capturing the first media data continuously in terms of time. That is to say, the capture time points of the first media data include the capture time point of the second media data, and then the capture times points of at least part of the first media data may be corresponded respectively to each piece of the second media data.

S803 is to detect operation information for the first navigation information and then determine a target first navigation point.

The first navigation information may indicate time information of the first media data, and each first navigation point in the first navigation information is configured to index a capture time point of the first media data.

The user may operate the first navigation information and select any first navigation point as a target navigation point.

Figure 9A:
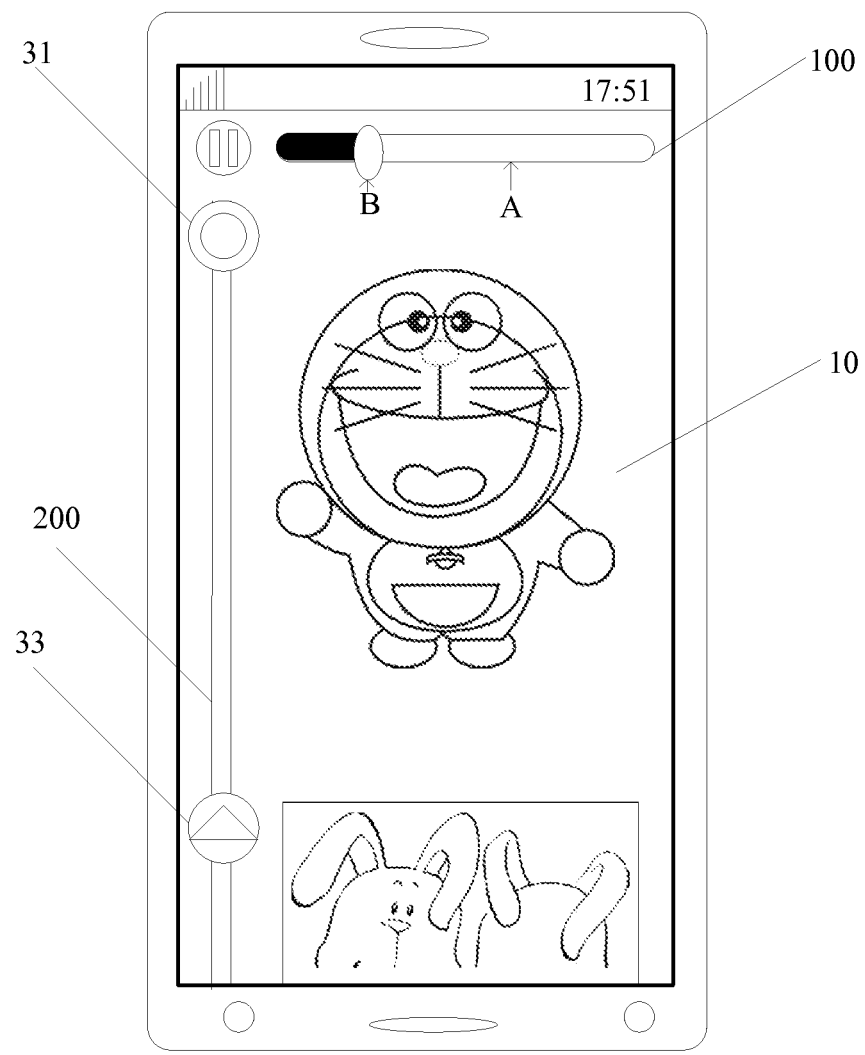
FIG. 9a is a schematic display diagram of a display interface of an electronic apparatus.

For example, in the case that the first navigation information is displayed on a display interface of a display unit of the electronic apparatus, the navigation information may consist of multiple continuous points, and each point is a first navigation point. The first navigation information displayed on the display interface may be represented as a navigation axis with a certain length. FIG. 9a is a schematic display diagram of a display interface of a display unit of the electronic apparatus in this embodiment, and a first navigation information first obtaining module 100 (represented as a navigation axis) is displayed on the display interface. The display unit may be a touch display unit, and the user may select a first navigation point A as a target first navigation point by touching any location of the first navigation information.

S804 is to determine a target capture time point and target second media data corresponded to the target capture time point according to the target first navigation point.

Each first navigation point corresponds to a capture time point of the first media data, and the time point of at least part of the first media data is corresponded respectively to a piece of second media data, i.e., each capture time point of the at least part of the data is corresponded to a piece of the second data.

Therefore, the corresponded target capture time point and the corresponded target second media data may be determined according to the target first navigation point.

S805 is to output the first media data at the target capture time point and output the target second media data synchronously.

After the target capture time point is determined, the first media data at the target capture time point may be output, and the target second media data may be output synchronously.

The second media data may be displayed on the display interface of the display unit of the electronic apparatus, such as image or text.

The first and the second navigation information may be displayed at the different locations of the display interface of the electronic apparatus, where the first navigation information is at a first location of the display unit, and the second navigation information is at a second location of the display unit. The second media data may be displayed on a display area excepting the first and the second location.

As a possible way of implementation, the first and the second location of the display interface, where the first and the second navigation information are located respectively, may be orthogonal.

As shown in FIG. 9a, the first navigation information is at the first location, the second navigation information 200 is at the second location, and the first and the second locations are orthogonal. In the display interface shown in FIG. 9a, the second media data output currently is an image 10 which is displayed on the display area excepting the first and the second location.

The target second media data may be displayed on the display interface by means of animation. For example, in the display area of the second media data, part of the target second media data may be output at a first sub area of the display area in a first duration after the target capture time point, and then all of the target second data may be output in a second duration.

Since each first navigation point of the first navigation information is configured to index a capture time point of the first media data, in the process of outputting the first media data, the first navigation point corresponding to the capture time point of the data output currently may be identified dynamically in the first navigation information in a way to remind the user the output progress of the first media data.

Therefore, In another embodiment, the method further includes:
  determining the capture time point of the first media data output currently and the current first navigation point corresponding to the capture time point; and
  identifying the current first navigation point at the location where the first navigation information is located in the display unit.

The method for identifying may be implemented in different ways, and the disclosure may be not limited in this aspect.

As shown in FIG. 9a, the first navigation point corresponding to the first media data output currently is a first navigation point B.

In the process of operating the first navigation information and selecting a first navigation point A as the target first navigation point.

Figure 9B:
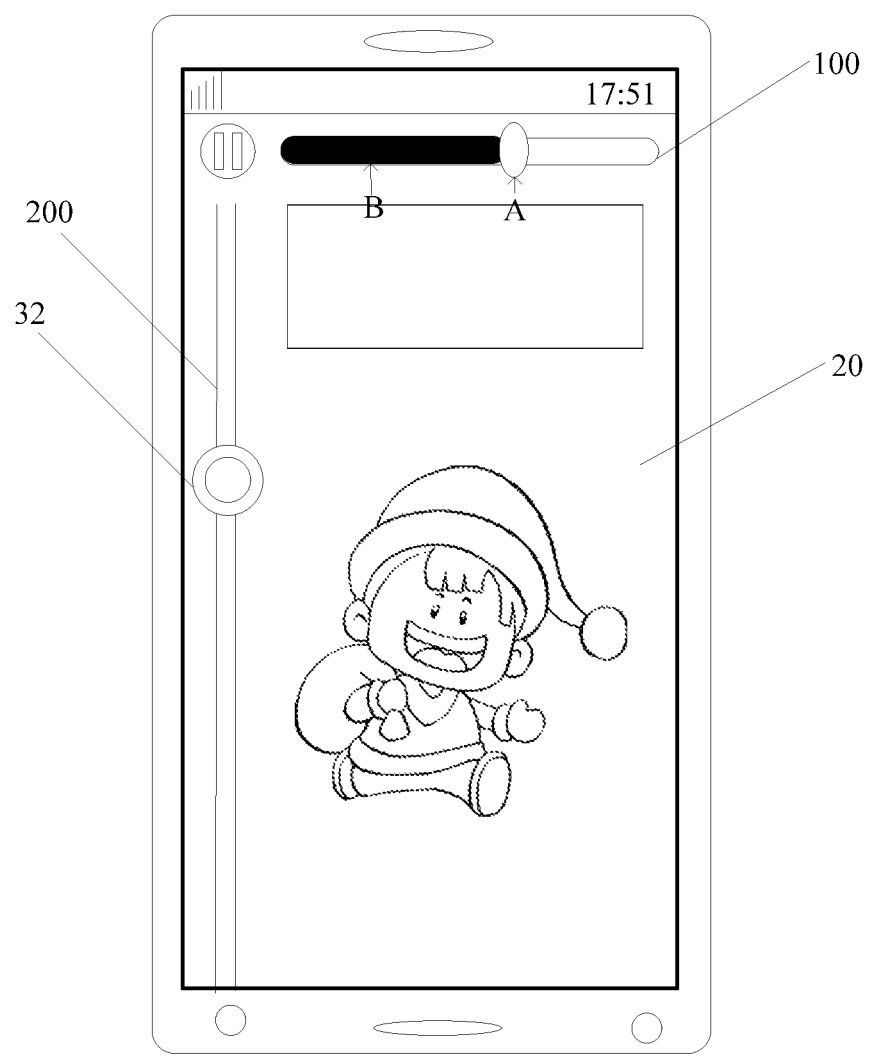
FIG. 9b is another schematic display diagram of a display interface of an electronic apparatus.

At the same time, the target second media data corresponding to the target capture time point may be output synchronously. FIG. 9b is a schematic display diagram of a display interface of a display unit of the electronic apparatus provided according to an embodiment of the disclosure. As shown in FIG. 9b, when the data corresponding to the first navigation point A in the first media data is input, the corresponded target second media data is media data 20 including image and text which may be output the display unit excepting the first and the second location.

Since there may be only the capture time point of part of the first media data is corresponded to the second media data, the capture time point of the first media data output currently is not corresponded to the second media data, and blank data may be output.

Therefore, there may not be target second media data which is corresponded to the selected target data capture time point. In a case that there is not target second media data which is corresponded to the target data capture time point, blank data may be output synchronously in a case that the data which is switched from the first media data at the target capture time point is output. In a case that the second media data can be displayed on the display unit, if there does not exist target second media data, the blank data may be output on the display area of the second media data on the display interface of the display unit of the electronic apparatus, such as a blank image.

At this point, in the process of outputting the blank data synchronously, In another embodiment, the method may further include:
  adding prompt information while outputting the second media data; and
  capturing the added second media data after receiving an adding instruction and establishing a corresponding relation with the target capture time point.

The electronic apparatus may further include a storage unit configured to storage the second media data, and the storage unit may be called by the added instruction and the user may select the added second media data in a way to establish a corresponding relation between the target capture time point and the added second media data. In a case that the first media data is output again, the added second media data may be output accordingly in a case that the target capture time point is reached without outputting the blank data.

The added prompt information may be image or text which can be identified by the user.

Since each piece of the second media data is corresponded to a second navigation point, the second navigation point is formed by multiple second navigation points, and the second navigation information may consist of continuous points, where the continuous points include the second navigation points. The multiple second navigation points may be set discretely in order in the second navigation information according to the sequence in outputting the second media data.

Therefore, in the process of outputting the first media data, while the second media data is output synchronously, the second navigation point corresponded to the second media data output currently may be identified dynamically in the second navigation information.

Therefore, the method may further include:

determining the current second navigation point corresponded to the second media data output currently; and identifying a location of the current second navigation point where the second navigation information in the display unit is located.

Therefore, in a case that the target capture time point is determined, the target second navigation point corresponded to the target second media data may be determined accordingly. Therefore, in the process of outputting the target second media data synchronously, the location of the target second navigation point where the second navigation information is located in the display unit.

There are multiple ways to identify the second navigation point, such as setting a selected identifier indicating that the location of the second navigation point is selected.

As shown in FIG. 9a, on the current display interface of the electronic apparatus, an identifier is set at the second navigation point 31 corresponded to the second media data 10 displayed currently, for example, the identifier may be a round icon.

As shown in FIG. 9b, a selected identifier is set at the target second navigation point 32 corresponded to the target second media data 20.

In the process of outputting the first media data, when reaching a predetermined duration before any capture time point of the capture time point of at least part of the data, the prompt information of the second media data corresponded to any capture time point may be output.

The prompt information may be to set a preselected identifier at the second navigation point corresponded to the second media data.

As shown in FIG. 9a, the second navigation 31 is corresponded to the second media data output currently. In the process of outputting the first media data, the second navigation corresponded to the next capture time point the navigation point 33, and then a preselected identifier may be set at the location of the second navigation point 33 in the second navigation information to be distinguished with the selected identifier, for example, the predetermining identifier may be a triangular icon.

The prompt information may be provided in other ways, such as lightening the second navigation point to prompt the user to output the second media data.

Figure 8A:
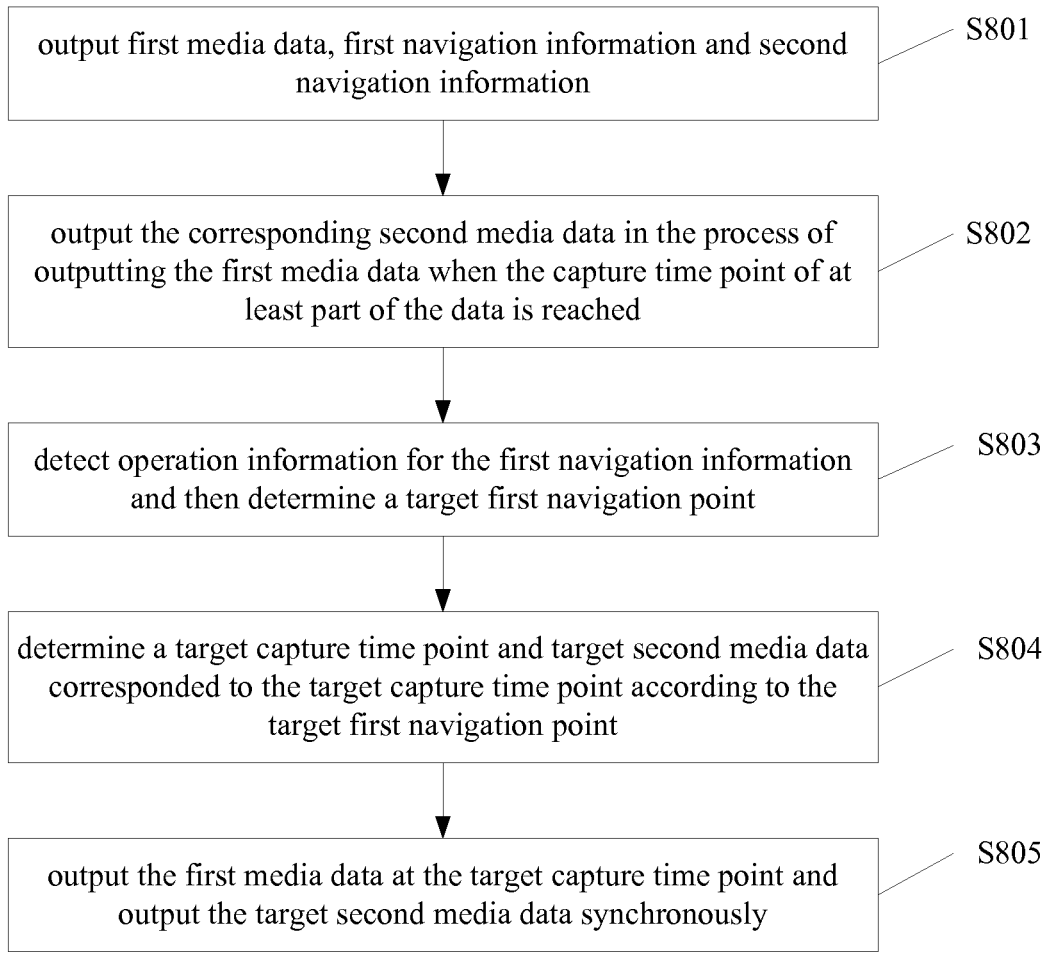
FIG. 8a is a schematic diagram of another method for processing data provided according to an embodiment of the disclosure.
Figure 8B:
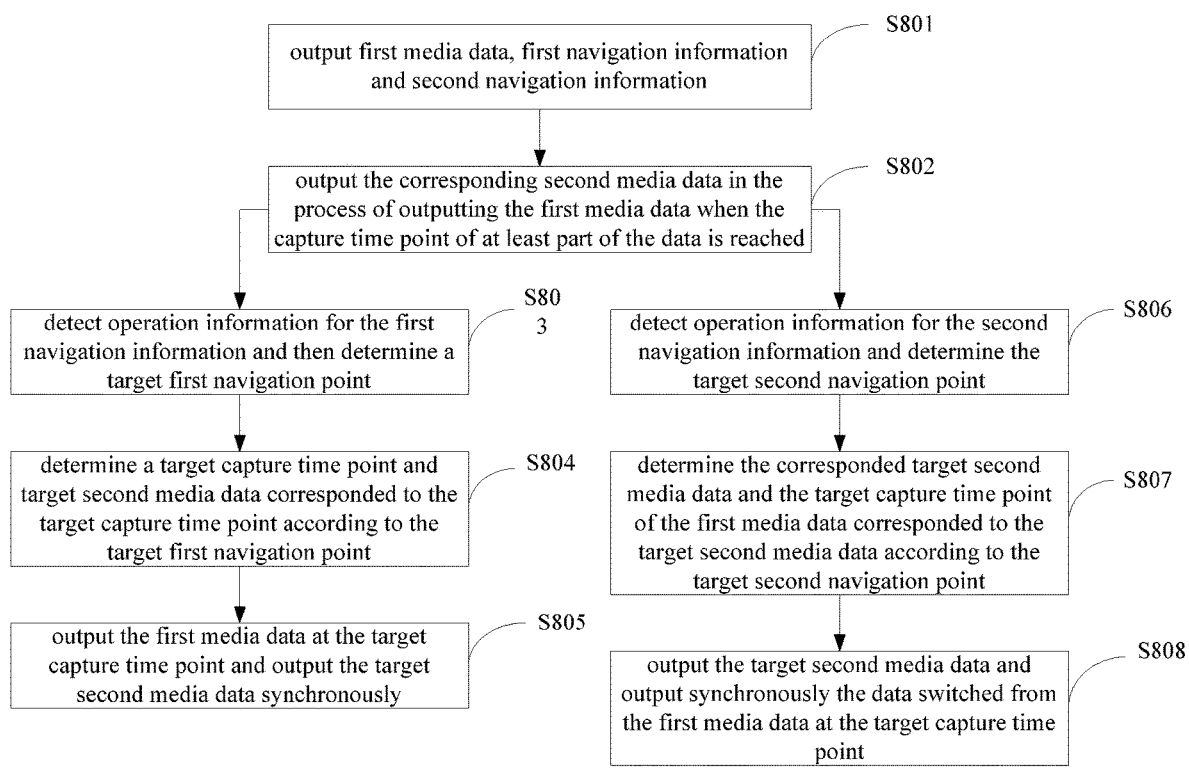
FIG. 8b is a schematic diagram of another method for processing data provided according to an embodiment of the disclosure.

In another embodiment, since each second navigation point is corresponded to a piece of second media data, the second navigation point may further be configured to index the second media data, hence in the process of outputting the first media data and the first and the second navigation information, the method may further include steps S806 to S808, as shown in FIG. 8b.

S806 is to detect operation information for the second navigation information and determine the target second navigation point.

S807 is to determine the corresponded target second media data and the target capture time point of the first media data corresponded to the target second media data according to the target second navigation point.

S808 is to output the target second media data and output synchronously the data switched from the first media data at the target capture time point.

As shown in FIG. 8a, the first navigation information 100 is at the first location, and the second navigation information 200 is at the second location, where the first and the second location is orthogonal. In the display interface shown in FIG. 9a, the second media data output currently is image 10, which is displayed on the display area excepting the first and the second locations.

The second media data output currently is the corresponded to the second navigation point 31. Assuming that the target second navigation point determined according to the operation information of the second navigation information is the second navigation point 33.

Figure 9C:
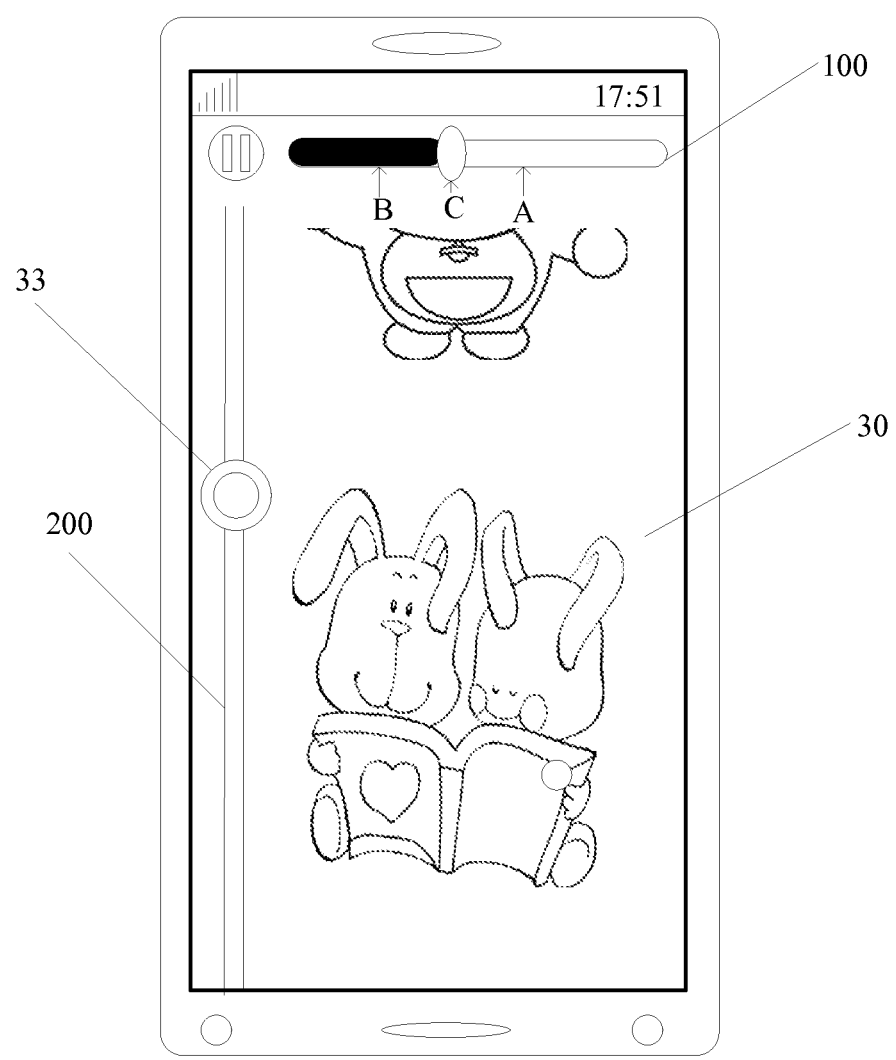
FIG. 9c is another schematic display diagram of a display interface of an electronic apparatus.

FIG. 9c is another schematic display diagram of the display interface of the display unit of the electronic apparatus provided according to an embodiment of the disclosure. FIG. 9c is a schematic display diagram in a case that the target second media data is displayed. In FIG. 9c, the target second media data is another image 30. The first navigation point corresponding to the target capture time point is a first navigation point C, hence the first navigation point C corresponding to the capture time point may further be identified at the same time.

In this embodiment, for the media information such as the first media data captured continuously in terms of time and the second media data captured discretely in terms of time, in the process of outputting the first media data, the second media data may be output synchronously according to the outputting relation between the first and the second media data. At the same time, the first and the second navigation information of the media information may be output synchronously, and the first and the second navigation information may be configured to index the first and the second media data, and the output of the first and the second media data may be controlled by the first and the second navigation information, hence the control may be efficient.

Figure 10:
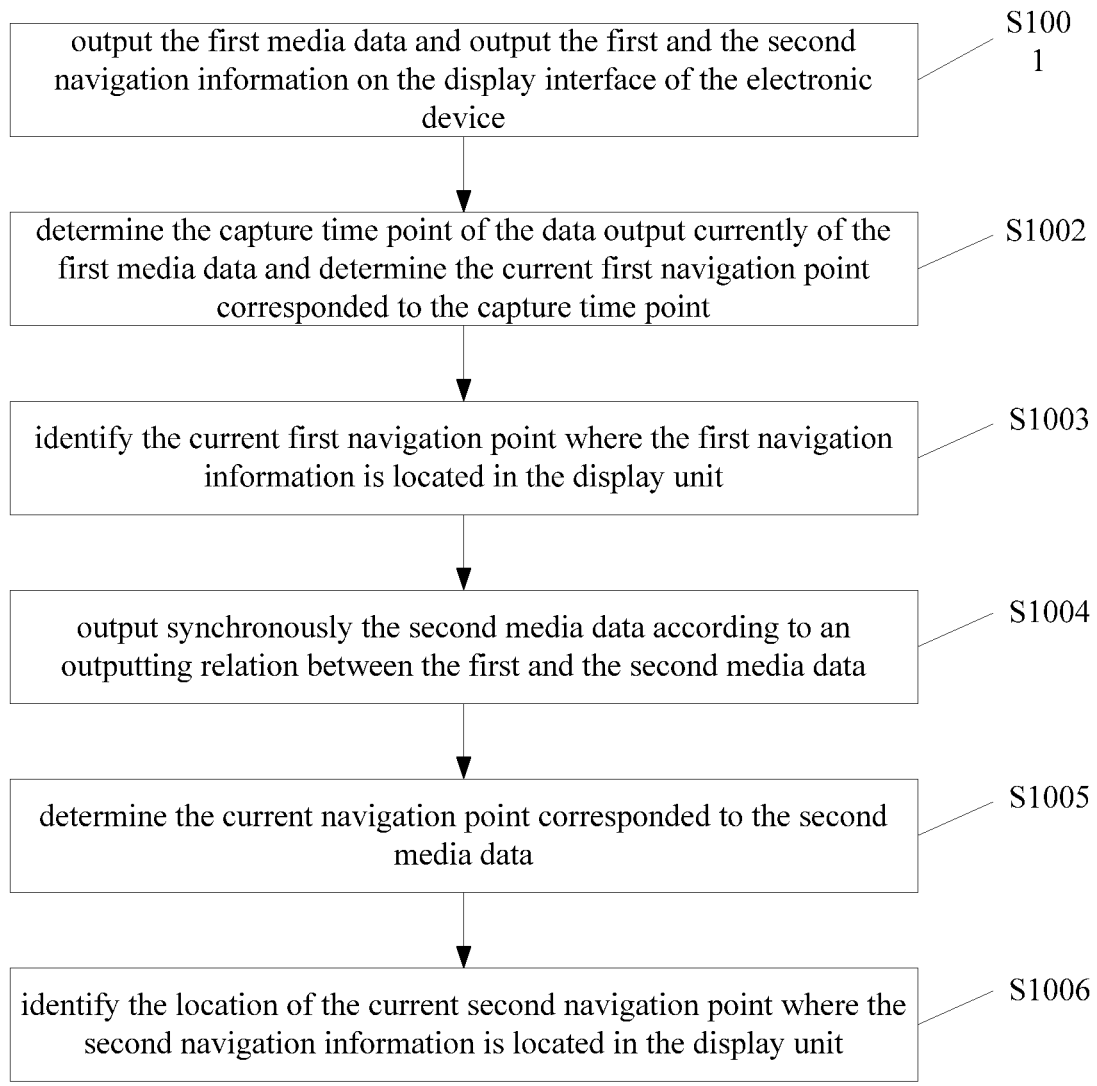
FIG. 10 is a flow chart of another method for processing data provided according to an embodiment of the disclosure.

FIG. 10 is a flow chart of a method for processing media data provided according to an embodiment of the disclosure, and the technical solution of the disclosure is applicable to electronic apparatus. The media information includes the first media data captured continuously in terms of time and the second media data captured discretely in terms of time, and the attribute parameters of the first and the second media data are different.

In this embodiment, the media data includes the first and the second navigation information, where the first navigation information is the time information of forming the first media data, and the first navigation information consists of multiple first navigation points. Each capture time point of the first media data is corresponded to a first navigation point; the second navigation information consists of multiple second navigation points, and each piece of second media data is corresponded to a second navigation point.

The method may further include steps S1001 to S1006.

S1001 is to output the first media data and output the first and the second navigation information on the display interface of the electronic apparatus.

S1002 is to determine the capture time point of the data output currently of the first media data and determine the current first navigation point corresponded to the capture time point.

S1003 is to identify the current first navigation point where the first navigation information is located in the display unit.

S1004 is to output synchronously the second media data according to an outputting relation between the first and the second media data.

The outputting relation between the first and the second media data is described in the above embodiment, and detailed description may be omitted herein.

S1005 is to determine the current navigation point corresponded to the second media data.

S1006 is to identify the location of the current second navigation point where the second navigation information is located in the display unit.

In this embodiment, the first and the second navigation information may be displayed at different locations of the display unit of the electronic apparatus, for example, the first navigation information in at the first location of the display interface, and second navigation information in at the second location of the display interface, where the first and the second locations may be different.

As a possible way of implementation, the first and second locations of the display interface where the first and the second navigation information are located may be orthogonal, as shown in FIG. 9a.

In the process of outputting the first media data, with the change of time and the first media data, the first navigation point corresponded to the capture time point of the data output currently may be identified dynamically in the first navigation information in a way to remind the user the output progress of the first media data.

As shown in FIG. 9a, the first navigation point corresponding to the data output currently of the first media data is the first navigation point B. As shown in FIG. 9b, the first navigation point corresponding to the data output currently of the first media data is the first navigation point A. As shown in FIG. 9c, the first navigation point corresponding to the data output currently of the first media data is the first navigation point C.

In this embodiment, the second media data may be output synchronously while outputting the first media data, and the second navigation point corresponding to the second media data output currently may be identified in the second navigation information.

Figure 11A:
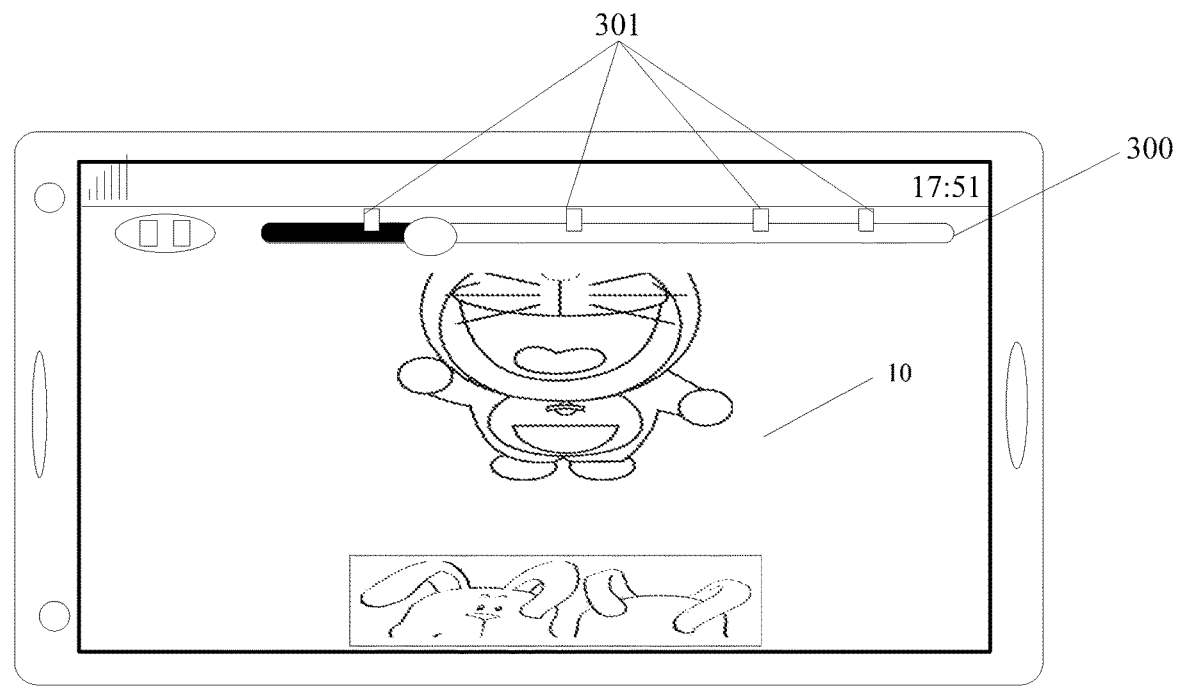
FIG. 11a is a schematic display diagram of a display interface of an electronic apparatus in the second display mode provided according to an embodiment of the disclosure.
Figure 11B:
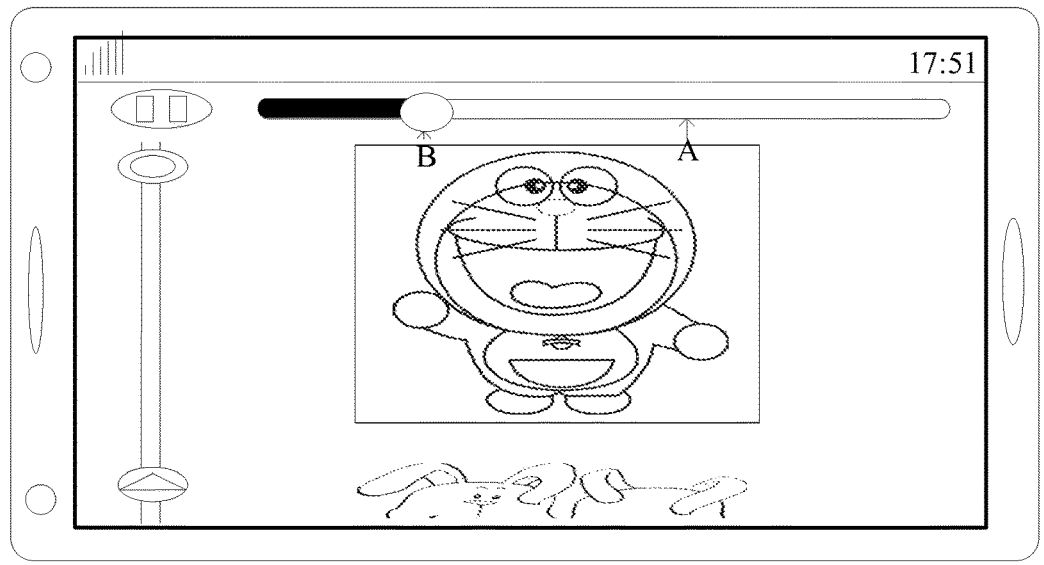
FIG. 11b is another schematic display diagram of a display interface of an electronic apparatus in the second display mode provided according to an embodiment of the disclosure.

As shown in FIG. 11a, the second navigation point corresponding to the second media data output currently is the second navigation point 31. As shown in FIG. 9b, the second navigation point corresponding to the second media data output currently is the second navigation point 32. As shown in FIG. 11b, the second navigation point corresponding to the second media data output currently is the second navigation point 33.

The way to identify the location of the first and the second navigation point is in the description of FIG. 11a to 11b in the above embodiment, and detailed description is omitted herein.

In this embodiment, the media information including the first and the second media data includes the first and the second navigation information, then according to the outputting relation, when outputting the first and the second media data, the first and the second navigation information may be output simultaneously on the display interface of the display unit of the electronic apparatus. At the same time, the first and the second navigation information may identify the locations of the first and the second navigation points corresponded to the data output currently with the outputting of the first or the second media data in a way to prompt the user directly, hence the user may learn the output progress of the data and relation between the first and the second media data.

The electronic apparatus applied in the embodiment of the disclosure may be provided with a first display mode and a second display mode. The display interfaces of the display unit in the first and the second mode vary in display direction, i.e., the directions in which the contents are displayed in the display interface are different. FIG. 9a to FIG. 9c are the schematic diagrams of the display interface of the electronic apparatus in the first display mode, and FIG. 11a is a schematic diagram of the display interface of the electronic apparatus in the second display mode. The switched may be implemented in different ways, such as rotating the electronic apparatus.

In practical application, in a case that the electronic apparatus is a cell phone, the first display mode is portrait mode, and the second display mode is landscape mode.

In the first display mode, the first and the second navigation information are located respectively the first and the second location of the display interface, where the first and the second location may be orthogonal.

In the method for processing data shown in FIG. 8 or FIG. 10, In another embodiment, the method may further include:
    detecting that the electronic apparatus is switched from the first display mode to the second display mode; and
    combining the first and the second navigation information to form third navigation information and outputting the third navigation information to the display interface.

The third navigation information consists of all the first navigation points of the first navigation information, and the first navigation point corresponded to the capture time point of at least part of the data of the first media data may be marked.

In a case that the electronic apparatus is switched from the first display mode to the second display mode, the media information may be provided with the third navigation information, where the third navigation information is formed by combing the first and the second navigation information. The third navigation information consists of continuous points, where each point is a first navigation point, which is corresponded to a capture time point of the media data. Since there exists second media data which is corresponded to the capture time point of at least part of the data of the first media data, the capture time point of the at least part of the data, i.e., the first navigation point corresponded to the second navigation point, may be marked in a way to realize the navigation for the second media data, such as to set a mark for a navigation point. As shown in FIG. 9a, first navigation information 100 and second navigation information 200 are combined to form third navigation information 300, where each navigation point in the third navigation information 300 is a first navigation point. In the third navigation information 300, a navigation point mark 301 is represented with a rectangle icon.

The third navigation information may be displayed at the first or the second location of the display interface or may be displayed at any location.

In a case that it is detected that the electronic apparatus is switched from the first display mode to the second display mode, the locations where the first and the second navigation information are displayed on the display interface may not change, or may changed with the change of the display direction accordingly, or only the location of the first or the second navigation information may change.

Therefore, in the first display mode, in a case that the first and the second navigation information are located respectively at the first and the second locations of the display interface, In another embodiment, the method may further include:
    detecting that the electronic apparatus is switched from the first display mode to the second display mode;
    switching the first navigation information from the first location to the third location of the display interface of the display unit; and/or switching the second navigation information from the second location to the fourth location of the display interface of the display unit.

The third location and the fourth location may be orthogonal or parallel.

FIG. 11a is another schematic display diagram of a display interface of an electronic apparatus in the second display mode. The first navigation information is switched from the first location to the third location, and the second navigation information is switched from the second location to the fourth location.

The above method embodiment set forth is described as a combination of a series of actions. However, those skilled in the art may understand that the disclosure is not limited in the sequence of the actions. Certain procedures may be implemented in other sequence or be implemented simultaneously according to the disclosure. In addition, those skilled in the art may understand that the embodiments described in the specifications are only the preferable embodiments of the disclosure, and the involved actions and modules may be not necessary for the disclosure.

Figure 12:
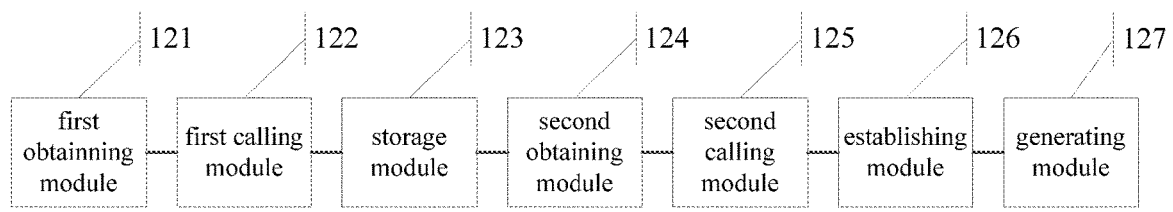
FIG. 12 is a schematic structure diagram of an electronic apparatus provided according to an embodiment of the disclosure.

Secondly, an electronic apparatus is provided according to an embodiment of the disclosure, where the electronic apparatus includes an operating system on which a first application program runs. As shown in FIG. 12, the device further includes:

- a first obtaining module 121, configured to run the first application on the operating system and obtain a first operation;
- a first calling module 122, configured to call a first service interface of the operating system according to the first operation and obtaining via the first service interface in real time multimedia data captured by a multimedia capture unit of the electronic apparatus;
- a storage module 123, configured to store the multimedia data into a storage medium of the electronic apparatus in real time;
- a second obtaining module 124, configured to obtain a second operation in the process of capturing the multimedia data in real time;
- a second calling module 125, configured to call a second service interface of the operating system according to the second operation and obtain via the second service interface first data captured by a data capture unit of the electronic apparatus;
- a establishing module 126, configured to establish an association relationship between the first data and the multimedia data in terms of time; and
- a generating module 127, configured to generate second data in a case that the multimedia capture unit of the electronic apparatus completes capturing the multimedia data, where the second data includes the association relationship.

Optionally, the device further includes:
a display unit, configured to display a capture progress of the multimedia data and the first data on an operating interface of the first application program in the process of capturing the multimedia data in real time.

Optionally, the establishing module 125 is configured to: display a data identifier of the second data on a progress bar of the capture progress.

Optionally, the establishing module 126 includes:
a determining unit, configured to determine the capture time of the first data; and
a first setting unit, configured to set the data identifier on the progress bar according to the capture time.

Optionally, the establishing module 126 includes:
a receiving unit, configured to receive a third operation of a user performed on a first location of the progress bar; and
a second setting unit, configured to respond to the third operation and set the data identifier at the first location.

Optionally, the electronic apparatus further includes:
a third obtaining module, configured to obtain an editing operation performed on the first data before the association relationship between the first data and the multimedia data in terms of time is established;
a responding module, configured to respond to the editing operation and edit the first data to obtain modified second data; and
a generating module, configured to establish an association relationship between the edited first data and the multimedia data.

Optionally, the electronic apparatus further includes: a setting module, configured to set the first data as an index of the second data in a way that the user may obtain the second data after searching based on the first data in a case that the second data is generated.

Optionally, the electronic apparatus further includes a receiving module configured to receive the user's operation for playing the second data and play the multimedia data in time order in the case that the second data is generated, and to play the first data.

Figure 13:
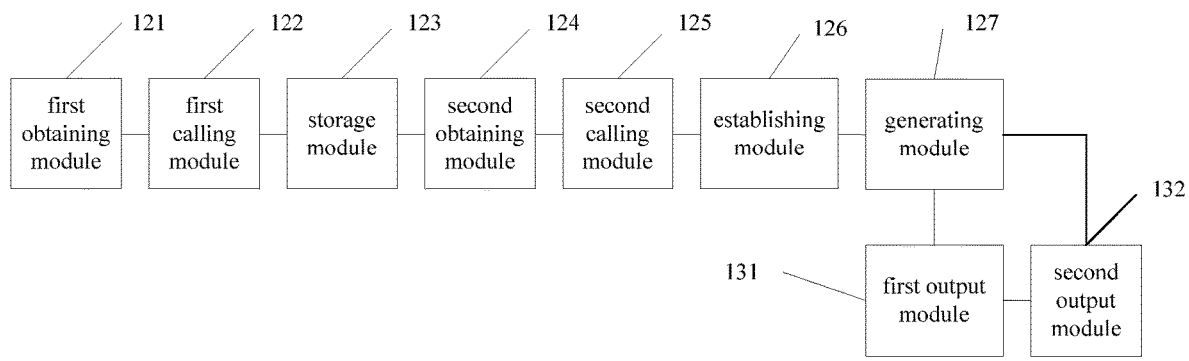
FIG. 13 is another schematic structure diagram of an electronic apparatus provided according to an embodiment of the disclosure.

FIG. 13 is a schematic structure diagram of another electronic apparatus provided according to an embodiment of the disclosure. The electronic apparatus is configured to process media data, where the media data includes first media data which is captured continuously in terms of time and the second media data which is captured discretely in terms of time. The attribute parameters of the first and the second media data are different. Compared with the last embodiment, besides the first obtaining module, the first calling module, storage module, the second obtaining module, the second calling module, the establishing module and the generating module, the electronic apparatus provided according to an embodiment of the disclosure may further include:

- a first output module 131, configured to output the first media data; and
- a second output module 132, configured to output synchronously the second media data according to the association relationship between the first and the second media data in the process of outputting the first media data.

As a possible way of implementation, the association relationship may be predetermined, and it is regulated that at least part of the data of the first media data captured continuously in terms of time or at least part of the capture time points is corresponded to a piece of second media data respectively.

As another possible way of implementation, the association relationship between the first and the second media data is formed in the process of obtaining the second media data captured discretely in terms of time in the process of capturing the first media data continuously in terms of time.

In this embodiment, for the media information such as the first media data captured continuously in terms of time and the second media data captured discretely in terms of time, when the electronic apparatus outputs the first media data, the second media data may be output synchronously according to the association relationship between the first and the second media data. The attribute parameters of the first and the second media data are different. In this embodiment, the media data with different types may be output simultaneously, and the information carried respectively by the first and the second media data may be associated, hence the information may be spread effectively and better understood. For example, in a case that the first media data is an audio, and second media data includes image and/or text, the image and/or text may be played with the audio, and then the audio information may be better understood and the information may be more diverse and interesting.

FIG. 12 is a schematic structure diagram of an electronic apparatus provided according to another embodiment of the disclosure.

The electronic apparatus is configured to process media data, where the media data includes first media data which is captured continuously in terms of time and the second media data which is captured discretely in terms of time. The attribute parameters of the first and the second media data are different.

In this embodiment, the media information includes first navigation information and second navigation information, where the first navigation information consisting of multiple first navigation points is time information of forming the first media data. Each capture time point of the first media data is corresponded to a first navigation point. The second navigation information consists of multiple second navigation points, where each piece of the second media data is corresponded to a second navigation point.

The electronic apparatus may include:
a first output module 1201, configured to output the first media data;
a second output module 1202, configured to output synchronously the second media data according to the association relationship between the first and the second media data in the process of outputting the first media data;
a third output module 1203, configured to output the first and the second navigation information to a display interface of the electronic apparatus when the first output module 1201 outputs the first media data;
a first determining module 1204, configured to determine the capture time point of the data output currently of the first media data and the current first navigation point corresponded to the capture time point in the process of outputting the first media data by the first output module;
a first identifying module 1205, configured to identify the current navigation point determined by the first determining unit where the first navigation information is located in the display unit;
a second determining module 1206, configured to determine the current second navigation point corresponding to the second media data output currently when the second output module outputs synchronously the second media data according to the association relationship between the first and the second media data; and
a second identifying module 1207, configured to identify the location of the second navigation point where the second navigation information is located in the display module.

In this embodiment, the media information including the first and the second media data includes the first and the second navigation information, then according to the association relationship, when outputting the first and the second media data, the first and the second navigation information may be output simultaneously on the display interface of the display unit of the electronic apparatus. At the same time, the first and the second navigation information may identify the locations of the first and the second navigation points corresponding to the data output currently with the outputting of the first or the second media data in a way to prompt the user directly, hence the user may learn the output progress of the data and relation between the first and the second media data.

FIG. 13 is a schematic structure diagram of an electronic apparatus provided according to another embodiment of the disclosure.

The electronic apparatus is configured to process media data, where the media data includes first media data which is captured continuously in terms of time and the second media data which is captured discretely in terms of time. The attribute parameters of the first and the second media data are different.

In this embodiment, the media information includes first navigation information and second navigation information. The first navigation information consisting of multiple first navigation points is time information of forming the first media data, and each first navigation point is configured to index a capture time point of the first media data, and multiple first navigation points form continuous first navigation information.

The second navigation information includes multiple second navigation points, and each piece of second media data corresponds to a second navigation point, i.e., each piece of the second media data is corresponded to a second navigation point.

The capture time point of at least part of the first media data corresponds to a piece of the second media data.

The electronic apparatus may include:
a first output module 1301, configured to output the first media data; and
a second output module 1302, configured to output the corresponding second media data when reaching the capture time point of at least part of the data in the process of outputting the first media data.

In this embodiment, the association relationship between the first and the second media data is that the capture time point of at least part of the data of the first media data is corresponded to a piece of second media data.

Similarly, the association relationship may be predetermined.

The association relationship may be also formed in the process of obtaining the second media data captured discretely in terms of time in the process of capturing the first media data continuously in terms of time.

a third output module 1303, configured to output the first and the second navigation media data while the second output module 1302 is outputting the first media data.

In the process of outputting the first media data, the third output module 1303 may output the first and the second navigation information to the display interface of the electronic apparatus.

A first detecting module 1304, configured to detect operation information for the first navigation information and determine the target first navigation point.

A third determining module 1305, configured to determine a corresponding target capture time point and target second media data corresponding to the target capture time point according to the target first navigation point.

Each first navigation point corresponds to a capture time point of the first media data, and the time point of at least part of the first media data corresponds respectively to a piece of second media data, i.e., each capture time point of the at least part of the data is corresponded to a piece of the second data.

The corresponding target capture time point and target second media data may be determined according to the target first navigation point.

a fourth output module 1306, configured to output the first media data at the target capture time point and output the target second media data synchronously.

In another embodiment, since each second navigation point is corresponded to a piece of second media data, the second navigation point may further be configured to index the second media data, in the process of outputting the first media data and the first and the second media data, the electronic apparatus may further include:

- a second detecting module 1307, configured to detect operation information for the second navigation information and determine the target second navigation point;
- a fifth determining module 1308, configured to determine the target second media data and the target capture time point of the first media data corresponding to the target second media data according to the target second navigation point; and
- a sixth determining module 1309, configured to output the target second media data and output synchronously the first media at the target capture time point.

In this embodiment, the first and the second navigation information may be displayed at different locations of the display unit of the electronic apparatus, for example, the first navigation information in at the first location of the display interface, and second navigation information in at the second location of the display interface, then the second media data may be displayed on the display area excepting the first and the second locations.

As a possible way of implementation, the first and the second locations of the display interface where the first and the second navigation information are located may be orthogonal.

Since each first navigation point in the first navigation information is configured to index a capture time point of the first media data, in the process of outputting the first media data, with the change of time and the first media data, the first navigation point corresponded to the capture time point of the data output currently may be identified dynamically in the first navigation information in a way to remind the user the output progress of the first media data.

In another embodiment, the third output module 1203 of the electronic apparatus is configured to output the first and the second navigation information to different locations of the display interface of the electronic apparatus. The electronic apparatus may further be configured to determine the capture time point of the data output currently of the first media data and the current navigation point corresponded to the capture time point. The current first navigation point where the first navigation information is located may be identified in the display unit.

There may be multiple ways for identifying, which the disclosure may not limit.

In another embodiment, since each piece of the second media data is corresponded to a second navigation point, the second navigation point is formed by multiple second navigation points, and the second navigation information may consist of continuous points, where the continuous points include the second navigation points. The multiple second navigation points may be set discretely in order in the second navigation information according to the sequence in outputting the second media data.

Therefore, in the process of outputting the first media data, while the second media data is output synchronously, the second navigation point corresponded to the second media data output currently may be identified dynamically in the second navigation information.

Therefore, the electronic apparatus may further include:

- a fourth determining module 1310, configured to determine the target second navigation point corresponding to the target second media data while the fourth output module outputs the target second media data; and
- a third identifying module 1311, configured to identify the location of the target second navigation point at the location of the second navigation information in the display interface.

There are multiple ways to identify the second navigation point, such as setting a selected identifier indicating that the location of the second navigation point is selected.

In another embodiment, in the process of outputting the first media data, the electronic apparatus may further include:

- a fifth output module 1312, configured to output the prompt information of the second media data corresponding to any capture time point when reaching a predetermined duration before any capture time point of the capture time point of at least part of the data in the process of outputting the first media data.

The prompt information may be to set a preselected identifier at the second navigation point corresponded to the second media data.

The prompt information may be provided in other ways, such as lightening the second navigation point to prompt the user to output the second media data.

In another embodiment, since there may be only the capture time point of part of the first media data is corresponded to the second media data, the capture time point of the data output currently of the first media data is not corresponded to the second media data, and blank data may be output.

Therefore, there may not be target second media data which is corresponded to the selected target data capture time point. In a case that there is not target second media data which is corresponded to the selected target data capture time point, the blank data may be output synchronously in a case that the first media data is output at the target capture time point. In a case that the second media data can be displayed on the display unit, if there does not exist target second media data, the blank data may be output synchronously on the display area of the second media data on the display interface of the display unit of the electronic apparatus, such as a blank image.

Therefore, the electronic apparatus may further include:

- a seventh output module 1313, configured to output the data which is switched from the first media data at the target capture time point and output blank data synchronously in a case that there is not target second media data which is corresponded to the target data capture time point.

At this point, in the process of outputting blank data, in another embodiment, the electronic apparatus may further include:

- a prompting module 1314, configured to output to add prompt information while outputting the second media data in a case that the seventh output unit outputs blank data synchronously; and
- a data establishing module 1315, configured to capture the added second media data after receiving an adding instruction and establish a corresponding relation with the target capture time point.

The electronic apparatus may further include a storage unit configured to storage the second media data, and the storage unit may be called by the added instruction and the user may select the added second media data in a way to establish a corresponding relation between the target capture time point and the added second media data. In a case that the first media data is output again, the added second media data may be output accordingly in a case that the target capture time point is reached without outputting the blank data.

In this embodiment, for the media information such as the first media data captured continuously in terms of time and the second media data captured discretely in terms of time, in the process of outputting the first media data, the second media data may be output synchronously according to the outputting relation between the first and the second media data. At the same time, the first and the second navigation information of the media information may be output synchronously, and the first and the second navigation information may be configured to index the first and the second media data, and the output of the first and the second media data may be controlled by the first and the second navigation information, hence the control may be efficient.

The electronic apparatus applied in the embodiment of the disclosure may be provided with a first display mode and a second display mode. The display interfaces of the display unit in the first and the second mode are different in display direction. In the first display mode, the first and the second navigation information are located respectively the first and the second location of the display interface.

Therefore, in another embodiment, the device may further include:
  a mode detecting module, configured to detect that the electronic apparatus is switched from the first display mode to the second display mode; and
  a navigation establishing module, configured to combine the first and the second navigation information to form third navigation information and output the third navigation information on the display interface, where the third navigation information consists of all the first navigation points of the first navigation information, and the first navigation point corresponding to the capture time point of at least part of the data of the first media data may be marked.

The third navigation information may be displayed at the first or the second location of the display interface or may be displayed at any location.

In a case that it is detected that the electronic apparatus is switched from the first display mode to the second display mode, the locations where the first and the second navigation information are displayed on the display interface may not change, or may changed with the change of the display direction accordingly, or only the location of the first or the second navigation information may change.

Therefore, in the first display mode, in a case that the first and the second navigation information are located respectively at the first and the second locations of the display interface, In another embodiment, the device may further include:
  a mode detecting module, configured to detect that the electronic apparatus is switched from the first display mode to the second display mode; and
  a location switching module, configured to switch the first navigation information from the first location to the third location of the display interface of the display unit; and/or to switch the second navigation information from the second location to the fourth location of the display interface of the display unit.

The technical effect of the disclosure is shown as follows: in a case that the capture of multimedia file is in process, the first data may be obtained; in a case that the capture of multimedia file is completed, the association relationship between the first data and the multimedia data in terms of time may be established, and then the second data may be generated, hence the user only need to search the second data rather than to search the multimedia data and the first data respectively in searching the multimedia data and the first data, such that the workload of the electronic apparatus may be lightened, thereby reducing the time cost for the user to search the first data and the multimedia data and improving the user experience.

It should be understood that, in the several embodiments according to the invention, the disclosed device and method may be implemented in other way. The above-described embodiments of the device are merely illustrative. For example, the division for the units is only based on a logic function. There may be other way to divide in actual implement. For example, multiple units or components may be combined or integrated into another system, or some features may be omitted or not be implemented. In addition, the illustrated or discussed mutual coupling or direct coupling or communication connection between the components may be indirect coupling or communication connection via some interfaces, devices or units, and may be electrical, mechanical or of other form.

It should be understood by those skilled in the art that all or a part of the steps for implementing the above method embodiments may be performed by related hardware instructed by a program. The program may be stored in a computer readable storage medium and when being executed may perform steps included in the above method embodiments. The storage medium includes various mediums which may store a program code, such as a removable storage device, a read only memory (ROM, Read-Only Memory), a random access memory (RAM, Random Access Memory), a diskette or a compact disk.

What are described above are only specific embodiments of the present invention. However the scope of protection of the present invention is not limited thereto. Any changes or equivalent substitutions made easily by any of those skilled in the art within the technical scope disclosed in the present invention fall within the scope of protection of the present invention. Therefore, the scope of protection of the present invention should consistent with the scope of protection of the claims.

The invention claimed is:

1. A method for processing data, applied to an electronic apparatus, the method comprising:
  while running a first application program on an operating system:
    receiving an indication of a first operation from a user of the electronic apparatus;
    calling a first service interface of the operating system according to the first operation;
    obtaining, via the first service interface in real time, first multimedia data, continuously in terms of time, captured by a multimedia capture unit of the electronic apparatus according to the first operation, wherein the multimedia capture unit includes at least one of a microphone and a camera;
    storing the first multimedia data into a storage medium of the electronic apparatus in real time;

while capturing the first multimedia data, monitoring for a second operation;

in response to receiving an indication of the second operation from the user, calling a second service interface of the operating system according to the second operation;

obtaining, via the second service interface, second multimedia data captured, discretely in terms of time, by a data capture unit of the electronic apparatus according to the second operation while capturing the first multimedia data;

establishing an association relationship between the second multimedia data and the first multimedia data in terms of time, wherein the second multimedia data and the first multimedia data are generated in a same context;

in response to completion of capturing the first multimedia data, generating relationship data, wherein the relationship data includes the association relationship between the first multimedia data and the second multimedia data;

outputting the first multimedia data to the user via at least one of a display device and an audio output device; and while outputting the first multimedia data, at a time dictated by the relationship data, automatically outputting the second multimedia data to the user via at least one of the display device and the audio output device, wherein:

outputting the first multimedia data includes displaying a first navigation information and a second navigation information on a display interface of the display device, the first navigation information is time information depicting a time span of the first multimedia data, the second navigation information includes a second navigation point, a capture time of the second multimedia data corresponds to the second navigation point, a displayed position of the second navigation point with respect to the first navigation information depicts a time during capture of the first multimedia data at which the second multimedia data was captured, the second multimedia data is automatically output to the user in response to output of the first multimedia data reaching the second navigation point the first navigation information includes multiple first navigation points, each first navigation point is configured to index a capture time point of the first multimedia data, a capture time point of at least part of the first multimedia data corresponds to a piece of the second multimedia data, automatically outputting the second multimedia data to the user comprises outputting corresponding second multimedia data in the case that the capture time point of the at least part of the first multimedia data is reached in the process of outputting the first multimedia data, and outputting the first multimedia data further includes:

detecting operation information for the first navigation information and determining a target first navigation point, determining a target capture time point and target second multimedia data corresponding to the target capture time point according to the target first navigation point, and outputting the first multimedia data at the target capture time point and outputting synchronously the target second multimedia data.

2. The method according to claim 1, wherein in the process of capturing the first multimedia data, an operating interface of the first application program displays a capture progress of the first multimedia data and the second multimedia data.

3. The method according to claim 2, wherein establishing an association relationship between the second multimedia data and the first multimedia data in terms of time comprises:

displaying a data identifier of the relationship data on a progress bar of the capture progress.

4. The method according to claim 3, wherein displaying the data identifier of the relationship data on the progress bar of the capture progress comprises:

determining a capture time of the second multimedia data; and setting the data identifier on the progress bar according to the capture time.

5. The method according to claim 3, wherein displaying the data identifier of the relationship data on the progress bar of the capture progress comprises:

receiving a third operation of a user performed on a first location of the progress bar; and responding to the third operation and setting the data identifier at the first location.

6. The method according to claim 1, wherein:

the method further comprises, before establishing an association relationship between the second multimedia data and the first multimedia data in terms of time:

obtaining an editing operation performed on the second multimedia data; and responding to the editing operation and editing the second multimedia data to obtain modified relationship data; and establishing an association relationship between the second multimedia data and the first multimedia data in terms of time comprises:

establishing an association relationship between edited second multimedia data and the first multimedia data.

7. The method according to claim 1, wherein the method further comprises, after generating the relationship data:

setting the second multimedia data as an index of the relationship data to facilitate a user obtaining the relationship data by searching the second multimedia data.

8. The method according to claim 1, wherein the process of displaying the first navigation information comprises:

determining a capture time point of the first multimedia data output currently and a current first navigation point corresponding to the capture time point;

identifying the current first navigation point at a location where the first navigation information is located in the display interface;

determining a current second navigation point corresponding to the second multimedia data output currently according to the association relationship between the first multimedia data and the second multimedia data; and identifying a location of the current second navigation point where the second navigation information is located in the display interface.

9. The method according to claim 1, wherein:
the second navigation point is configured to index the second multimedia data; and
the method further comprises:
  detecting operation information for the second navigation information and determining a target second navigation point;
  determining the target second multimedia data and the target capture time point of the first multimedia data corresponding to the target second multimedia data according to the target second navigation point; and
  outputting the target second multimedia data and outputting synchronously the first multimedia data at the target capture time point.

10. The method according to claim 8, wherein:
the electronic apparatus has a first display mode and a second display mode;
the display interfaces of the display unit in the first display mode and the second display mode are different in display direction;
in the first display mode, the first and the second navigation information are located respectively at a first and a second location of the display interface; and
the method further comprises:
  detecting that the electronic apparatus is switched from the first display mode to the second display mode;
  combining the first navigation information and the second navigation information to form third navigation information;
  outputting the third navigation information on the display interface; and
  marking the current first navigation point corresponding to the capture time point of at least part of the first multimedia data.

11. An electronic apparatus, comprising a processor and a memory storing program codes, wherein the processor performs the stored program codes to, while running a first application program on an operating system:
  receive an indication of a first operation from a user of the electronic apparatus;
  call a first service interface of the operating system according to the first operation;
  obtain, via the first service interface in real time, first multimedia data captured, continuously in terms of time, by a multimedia capture unit of the electronic apparatus, wherein the multimedia capture unit includes at least one of a microphone and a camera;
  store the first multimedia data into a storage medium of the electronic apparatus in real time;
  while capturing the first multimedia data, monitoring for a second operation;
  in response to receiving an indication of the second operation from the user, call a second service interface of the operating system according to the second operation; and
  obtain, via the second service interface, second multimedia data captured, discreetly in terms of time, by a data capture unit of the electronic apparatus according to the second operation while capturing the first multimedia data;
  establish an association relationship between the second multimedia data and the first multimedia data in terms of time, wherein the second multimedia data and the first multimedia data are generated in a same context;
  in response to completion of capturing the first multimedia data, generate relationship data, wherein the relationship data includes the association relationship between the first multimedia data and the second multimedia data;
  output the first multimedia data to the user via at least one of a display device and an audio output device; and
  while outputting the first multimedia data, at a time dictated by the relationship data, automatically output the second multimedia data to the user via at least one of the display device and the audio output device,
wherein:
  the processor performs the stored program codes to output a first navigation information and a second navigation information on a display interface of the display device in a case that the first multimedia data is outputted,
  the first navigation information is time information depicting a time span of the first multimedia data,
  the second navigation information includes a second navigation point,
  a capture time of the second multimedia data corresponds to the second navigation point,
  a displayed position of the second navigation point with respect to the first navigation information depicts a time during capture of the first multimedia data at which the second multimedia data was captured,
  the second multimedia data is automatically output to the user in response to output of the first multimedia data reaching the second navigation point,
  the first navigation information includes multiple first navigation points,
  each first navigation point is configured to index a capture time point of the first multimedia data,
  a capture time point of at least part of the first multimedia data corresponds to a piece of the second multimedia data, and
  the processor further performs the stored program codes to:
    detect operation information for the first navigation information and then determine a target first navigation point,
    determine a target capture time point and target second multimedia data corresponding to the target capture time point according to the target first navigation point, and
    output the first multimedia data at the target capture time point and output the target second multimedia data.

12. The electronic apparatus according to claim 11, wherein the processor further performs the stored program codes to:
  obtain an editing operation performed on the second multimedia data before the association relationship between the second multimedia data and the first multimedia data in terms of time is established;
  respond to the editing operation and edit the second multimedia data to obtain modified relationship data; and
  establish an association relationship between the edited second multimedia data and the first multimedia data.

13. The electronic apparatus according to claim 11, wherein the processor further performs the stored program codes to:
  set the second multimedia data as an index of the relationship data to facilitate a user obtaining the relationship data by searching the second multimedia data after generating the relationship data.

14. The electronic apparatus according to claim 11, wherein the processor further performs the stored program codes to:
   determine a capture time point of the first multimedia data output currently and a current first navigation point corresponding to the capture time point in the process of outputting the first multimedia data;
   identify the current first navigation point at a location where the first navigation information is located in the display interface;
   determine a current second navigation point corresponding to the second multimedia data output currently in the case that the second multimedia data is outputted according to the association relationship between the second multimedia data and the first multimedia data; and
   identify a location of the current second navigation point where the second navigation information is located.

15. The electronic apparatus according to claim 14, wherein:
   the second navigation point is configured to index the second multimedia data; and
   the processor further performs the stored program codes to:
      detect operation information for the second navigation information and determine a target second navigation point;
      determine target second multimedia data and the capture time point of the first multimedia data corresponding to the target second multimedia data according to the target second navigation point; and
      output the target second multimedia data and output synchronously the first multimedia data at the capture time point.

16. The electronic apparatus according to claim 14, wherein:
   the electronic apparatus has a first display mode and a second display mode;
   the display interfaces of the display unit in the first display mode and the second display mode are different in display direction;
   in the first display mode, the first navigation information and the second navigation information are located respectively at a first location and a second location of the display interface; and
   the processor further performs the stored program codes to:
      detect that the electronic apparatus is switched from the first display mode to the second display mode;
      combine the first navigation information and the second navigation information to form third navigation information; and
      output the third navigation information on the display interface,
   wherein the third navigation information comprises multiple first navigation points, and
   wherein the current first navigation point corresponding to the capture time point of at least part of the first multimedia data is marked.

* * * * *